United States Patent
Noh et al.

(10) Patent No.: US 7,606,365 B2
(45) Date of Patent: Oct. 20, 2009

(54) ENCRYPTION/DECRYPTION SYSTEM AND KEY SCHEDULER WITH VARIABLE KEY LENGTH

(75) Inventors: Mi-jung Noh, Yongin-si (KR); Kyoung-moon Ahn, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 859 days.

(21) Appl. No.: 11/032,118

(22) Filed: Jan. 11, 2005

(65) Prior Publication Data

US 2005/0190923 A1   Sep. 1, 2005

(30) Foreign Application Priority Data

Feb. 26, 2004   (KR)   ............... 10-2004-0012992

(51) Int. Cl.
*H04N 7/167*   (2006.01)
(52) U.S. Cl. ...................... 380/203; 380/278
(58) Field of Classification Search ......... 380/203, 380/278
See application file for complete search history.

(56) References Cited

U.S. PATENT DOCUMENTS

| 5,511,123 | A | * | 4/1996 | Adams | ........... | 380/29 |
| 5,745,577 | A | * | 4/1998 | Leech | ........... | 380/28 |
| 6,243,470 | B1 | * | 6/2001 | Coppersmith et al. | ....... | 380/259 |
| 6,298,136 | B1 | * | 10/2001 | Den Boer | ........... | 380/29 |
| 6,314,186 | B1 | * | 11/2001 | Lee et al. | ........... | 380/28 |
| 7,079,651 | B2 | * | 7/2006 | Den Boer | ........... | 380/37 |
| 7,142,671 | B2 | * | 11/2006 | Qi et al. | ........... | 380/29 |
| 7,280,657 | B2 | * | 10/2007 | Anand | ........... | 380/37 |
| 7,295,671 | B2 | * | 11/2007 | Snell | ........... | 380/28 |
| 7,366,300 | B2 | * | 4/2008 | Qi et al. | ........... | 380/29 |
| 2002/0034295 | A1 | * | 3/2002 | Den Boer | ........... | 380/37 |
| 2002/0061107 | A1 | * | 5/2002 | Tham et al. | ........... | 380/259 |

(Continued)

FOREIGN PATENT DOCUMENTS

JP   2003-15522   1/2003

(Continued)

OTHER PUBLICATIONS

Korean Office Action dated Feb. 13, 2006, with English translation.

(Continued)

*Primary Examiner*—David García Cervetti
(74) *Attorney, Agent, or Firm*—Harness, Dickey & Pierce, P.L.C.

(57) ABSTRACT

A key scheduler, which may selectively generate an encryption round key and a decryption round key corresponding to an initial round key, which may have a variable key length. The key scheduler may include a key storage unit, a key calculating unit, and a key output unit. The key storage unit may receive and store calculation key data items or storage key data items as input key data items, and may output the stored input key data items as the storage key data items. The key calculating unit may output the calculation key data items as the calculation result. The key output unit may select units of the input key data items and the storage key data items in response to output control signals, and may output them as an encryption round key or a decryption round key.

29 Claims, 10 Drawing Sheets

U.S. PATENT DOCUMENTS

| | | | |
|---|---|---|---|
| 2002/0101986 A1* | 8/2002 | Roelse | 380/42 |
| 2002/0106078 A1* | 8/2002 | Qi et al. | 380/29 |
| 2002/0106080 A1* | 8/2002 | Qi et al. | 380/37 |
| 2002/0108048 A1* | 8/2002 | Qi et al. | 713/189 |
| 2002/0131588 A1* | 9/2002 | Yang | 380/37 |
| 2003/0002664 A1* | 1/2003 | Anand | 380/37 |
| 2003/0059054 A1* | 3/2003 | Hu et al. | 380/277 |
| 2003/0086564 A1* | 5/2003 | Kuhlman | 380/37 |
| 2003/0108195 A1* | 6/2003 | Okada et al. | 380/37 |
| 2003/0223580 A1* | 12/2003 | Snell | 380/28 |
| 2004/0047466 A1* | 3/2004 | Feldman et al. | 380/37 |
| 2005/0050340 A1* | 3/2005 | Lee | 713/189 |
| 2005/0063538 A1* | 3/2005 | Tham et al. | 380/28 |
| 2005/0190923 A1* | 9/2005 | Noh et al. | 380/278 |
| 2006/0002549 A1* | 1/2006 | Avasarala et al. | 380/44 |
| 2006/0050887 A1* | 3/2006 | Chen | 380/270 |
| 2006/0198524 A1* | 9/2006 | Sexton | 380/277 |
| 2008/0101599 A1* | 5/2008 | Yang | 380/44 |
| 2008/0137866 A1* | 6/2008 | Yang | 380/277 |
| 2008/0240426 A1* | 10/2008 | Gueron et al. | 380/44 |

FOREIGN PATENT DOCUMENTS

| | | |
|---|---|---|
| KR | 10-2002-0061718 | 7/2002 |
| KR | 2002-0061718 | 7/2002 |
| KR | 2003-0051111 | 6/2003 |
| WO | WO 04/002057 A2 | 12/2003 |

OTHER PUBLICATIONS

German Office Action dated Apr. 1, 2009.

* cited by examiner

ENCRYPTION/DECRYPTION SYSTEM AND KEY SCHEDULER WITH VARIABLE KEY LENGTH

BACKGROUND OF THE INVENTION

This application claims the priority of Korean Patent Application No. 2004-12992, filed on Feb. 26, 2004, in the Korean Intellectual Property Office, the disclosure of which is incorporated herein in its entirety by reference.

1. Field of the Invention

Exemplary embodiments of the present invention relate to an encryption/decryption system and a key scheduler with variable key length.

2. Description of the Conventional Art

A block cipher algorithm (e.g., AES algorithm) may divide a real time data stream into data blocks and may encrypt or decrypt the data blocks. The length of one block may be 128 bits, and the algorithm may be implemented in software or hardware. An encryption/decryption system implemented in hardware may be used for higher speed application products.

Encryption using the block cipher algorithm may be performed through, for example, SubBytes conversion, ShiftRows conversion, MixColumns conversion and AddRoundKey conversion processes. Decryption using the block cipher algorithm may be performed through, for example, InvShiftRows conversion, InvSubBytes conversion, InvMixColumns conversion and AddRoundKey conversion processes. All, or substantially all, of the conversion processes for encryption or decryption may be performed in rounds. After one round is completed, the round may be repeated multiple times to encrypt or decrypt of data.

In the AddRoundKey conversion process, data blocks, processed by previous conversion processes, may be mixed with round keys generated by a key scheduler, and may be converted to an encrypted or decrypted data stream. An initial input key, which may be input to the key scheduler in order to generate a round key, which may have, for example, a key length of 128 bits, 192 bits or 256 bits. As the length of the initial input key may increase, the level of data encryption may increase. The number of repetitions of the round may be determined by the length of the initial input key. For example, the encryption/decryption system may perform 10 rounds when the length of the initial input key is 128 bits, 12 rounds when 192 bits, and 14 rounds when 256 bits. The key scheduler may provide the round key whenever the encryption/decryption system performs a round.

The key scheduler may be constructed, for example, in an on-the-fly method or pre-computation method. The on-the-fly method may generate the round key, for example, simultaneously, with encryption or decryption of data. The on-the-fly method may generate and output the round key used for each round when the round is executed. The pre-computation method may previously generate round keys, which may be used for all of the rounds, may store the round keys in a memory, and may read and output a round key used for each round from the memory.

The pre-computation method may use a larger capacity memory for storing the previously generated round keys. According to the pre-computation method, a round key may be read from the memory for each round, and the corresponding operating speed of an encryption may be lower. The length of all, or substantially all, of the round keys may correspond to the number of bits in one block, which may be encrypted or decrypted (128 bits×(the number of rounds+1)). For example, the number of rounds may be 10 when each round key is 128 bits. The length of all, or substantially all, of the round keys stored in the memory may be 1408(128×11) bits. Alternatively, the round key may be 192 bits and 256 bits, and the length of all, or substantially all, of the round keys may correspond to 1644(128×13) bits and 1920(128×15) bits, respectively.

A register may be used to store the round keys, and hardware, which may have, for example, at least 15,000 gates, may be used when the round key length is 256 bits. The key scheduler need not include a larger capacity memory for storing the round keys and may use a smaller space for storing one round key.

FIG. 1 is a block diagram of a conventional encryption/decryption system using a block cipher algorithm (e.g., an AES algorithm), which may include a key scheduler. Referring to FIG. 1, the conventional encryption/decryption system 10 may include a controller 11, an encryption key scheduler 12, a decryption key scheduler 13, and a block round processor 14. The encryption key scheduler 12 may generate an encryption round key R_KEY from an initial round key E_INKEY received from an external apparatus and may output the encryption round key R_KEY to the block round processor 14. The decryption key scheduler 13 may generate a decryption round key IR_KEY from an initial round key D_INKEY received from an external apparatus and may output the decryption round key IR_KEY to the block round processor 14.

The conventional encryption key scheduler 12 and the decryption key scheduler 13 may be constructed in hardware devices.

The encryption key scheduler 12 and the decryption key scheduler 13 may perform word substitution processes when generating the encryption round key and decryption round key. In the word substitution processes, the encryption key scheduler 12 and the decryption key scheduler 13 may divide 32-bit key data into four words of 8 bits and substitute for the four words using four substitution tables. The initial round key E_INKEY and the initial round key D_INKEY may be 256 bits, and the encryption key scheduler 12 and the decryption key scheduler 13 may perform the word substitution process twice per clock cycle. The encryption key scheduler 12 and the decryption key scheduler 13 may have eight substitution tables. The substitution tables may be constructed in hardware having between 800 and 2200 gates. Eight substitution tables may use between 6400 and 17600 gates. The encryption key scheduler 12 and the decryption key scheduler 13 may increase the size of the encryption/decryption system.

SUMMARY OF THE INVENTION

In an exemplary embodiment of the present invention, a system for encrypting or decrypting data may include a controller, a processor, and a key scheduler. The controller may control the processor and the key scheduler and the processor may encrypt or decrypt data based on an encryption or decryption key generated by the key scheduler. The key scheduler may further include a key storage unit, a key calculating unit, and a key output unit. The key storage unit may receive and store calculation key data items or storage key data items as input key data items in response to load enable signals and a clock signal and may output the stored input key data items as the storage key data items. The key calculating unit may calculate the storage key data items and may output the calculation key data items as a calculation result in response to calculation control signals. The key output unit may select parts of the input key data items and the storage key data items in response to output control signals to output them as an encryption round key or a decryption round key.

In another exemplary embodiment of the present invention, a key scheduler may include a key storage unit, a key calculating unit, and a key output unit. The key storage unit may receive and store calculation key data items or storage key data items as input key data items in response to load enable signals and a clock signal and may output the stored input key data items as the storage key data items. The key calculating unit may calculate the storage key data items and may output the calculation key data items as a calculation result in response to calculation control signals. The key output unit may select parts of the input key data items and the storage key data items in response to output control signals to output them as an encryption round key or a decryption round key.

In another exemplary embodiment of the present invention, an apparatus for calculating a plurality of calculation key data items may include an independent calculator and a plurality of chain calculators. The independent calculator may perform a logic operation on a substitution key data and a round constant and output a conversion key data. The plurality of chain calculators may be connected to a corresponding register and may output a plurality of calculation key data items in response to a plurality of storage key data items and conversion key data.

In another exemplary embodiment of the present invention, an apparatus for generating storage key data items may include clock gate circuits and a plurality of registers. The clock gate circuits may provide a clock signal to the plurality of registers or interrupt the supply of the clock signal in response to load enable signals. The plurality of registers may store calculation key data items in response to the clock signal and may output the calculation key data items as storage key data items.

In another exemplary embodiment of the present invention, an apparatus for generating an encryption or decryption round key may include internal select circuits and an output selector. The internal select circuits may select and output input key data items or storage key data items as output key data items in response to internal select signals. The output selector may receive the output key data items from the internal select circuits and select parts of the output key data items in response to output select signals to output as the encryption or decryption round key.

In another exemplary embodiment of the present invention, an apparatus for generating storage key data items may include load enable circuits and registers. The load enable circuits may output calculation key data items or storage key data items as input key data items in response to load enable signals. The registers may store the input key data items received from the load enable circuits in response to a clock signal and outputting the input key data items as the storage key data items.

In exemplary embodiments of the present invention, the key storage unit may store initial key data items associated with an initial round key in response to the load enable signals and the clock signal when the initial key data items are received from an external apparatus, and may output the initial key data items as the storage key data items.

In exemplary embodiments of the present invention, each of the initial key data items may have N bits, where N may be a natural number and the number of encryption and decryption round keys and the number of times the storage key data items may be calculated may be decided by the size of the initial key data items.

In exemplary embodiments of the present invention, the key calculating unit may calculate the storage key data items R times, where R may be a natural number smaller than N, when the initial key data items may be J bits, where J may be a natural number larger than N, may calculate the storage key data items S times, where S may be a natural number between R and N, when the initial key data items may be K bits, where K may be a natural number larger than J, and may calculate the storage key data items T times, where T may be a natural number between S and N, when the initial key data items may be L bits, where L may be a natural number larger than K, in response to the calculation control signals.

In exemplary embodiments of the present invention, the key output unit may generate R encryption round keys or decryption round keys of J bits, when the initial key data items may be J bits, may generate S encryption round keys or decryption round keys of J bits when the initial key data items may be K bits, and may generate T encryption round keys or decryption round keys of J bits when the initial key data items may be L bits, in response to the output control signals.

In exemplary embodiments of the present invention, the key output unit may output a last encryption round key as a first decryption round key in response to the output control signals.

In exemplary embodiments of the present invention, the key calculating unit may calculate the storage key data items 2R times, when the initial key data items may be J bits, 2S times, when the initial key data items may be K bits, and 2T times, when the initial key data items may be L bits, where R may be less than S, S may be less than T, T may be less than K, and K may be less than L.

In exemplary embodiments of the present invention, the key output unit may be disabled when the key calculating unit may calculate the storage key data items R-1 times, S-1 times or T-1 times, and the key output unit may be enabled when the key calculating unit may calculate and may output a last decryption round key.

In exemplary embodiments of the present invention, the key storage unit may store the input key data items for each clock cycle, when the initial key data items may be J bits, may store the input key data items for every two clock cycles when the initial key data items may be K bits, and may store a part of the input key data items for each clock cycle when the initial key data items may be L bits, where K may be less than L.

In exemplary embodiments of the present invention, the key storage unit may further include load enable circuits for outputting the calculation key data items or the storage key data items as the input key data items in response to the load enable signals, and registers for storing the input key data items received from the load enable circuits in response to the clock signal and outputting the stored input key data items as the storage key data items.

In exemplary embodiments of the present invention, each of the load enable signals may be input to a pair of the load enable circuits.

In exemplary embodiments of the present invention, the load enable circuits may output the calculation key data items as the input key data items when the load enable signals may be enabled, and may output the storage key data items as the input key data items when the load enable signals may be disabled.

In exemplary embodiments of the present invention, parts of the load enable circuits may be operated when the initial key data items may be J or K bits, and all of the load enable circuits may be operated when the initial key data items may be L bits, where K may be less than L, and J may be less than K.

In exemplary embodiments of the present invention, the number of the load enable circuits operated when the initial key data items may be J bits may be smaller than the number of the load enable circuits operated when the initial key data items may be K bits, where J may be less than K.

In exemplary embodiments of the present invention, the number of the load enable circuits and the number of the registers, included in the key storage unit, may be L/N.

In exemplary embodiments of the present invention, the key calculating unit may further include a plurality of chain calculators and an independent calculator.

In exemplary embodiments of the present invention, each of the plurality of chain calculators and the independent calculator may perform an exclusive-OR operation.

In exemplary embodiments of the present invention, a first chain calculator may perform a logic operation on the conversion key data and a first storage key data item to output a first calculation key data item, and each of the remaining plurality of chain calculators may perform a logic operation on a previous calculation key data items, which may be received from a previous chain calculator, and storage key data items, which may be received from the corresponding register, and may output a next calculation key data item.

In exemplary embodiments of the present invention, the output control signals may include internal select signals and output select signals, and the key output unit may include internal select circuits and an output selector.

In exemplary embodiments of the present invention, each of the internal select signals may be input to a pair of internal select circuits.

In exemplary embodiments of the present invention, the internal select circuits may select the calculation key data items to output as the output key data items, when the internal select signals may be enabled, and may select the storage key data items to output as the output key data items, when the internal select signals may be disabled.

In exemplary embodiments of the present invention, the calculation control signals may include first, second, third and fourth calculation control signals, and the key calculating unit may further include a first select circuit, a second select, a word rotation unit, a third select circuit, a word substitution unit, and a round constant generator.

In exemplary embodiments of the present invention, the first calculation control signal may be disabled when the initial key data items may be J or K bits, and alternately enabled and disabled for each clock cycle when the initial key data items may be L bits. The second and third calculation control signals may be disabled when the initial key data items may be J bits. The second calculation control signal may be enabled and the third calculation control signal may be disabled when the initial key data items may be K bits, and the second calculation control signal may be disabled and the third calculation control signal may be enabled when the initial key data items may be L bits. The fourth calculation control signal may be disabled when the initial key data items may be J or K bits, and alternately disabled and enabled for each clock cycle when the initial key data items may be L bits. Where J may be less than K, and K may be less than L.

In exemplary embodiments of the present invention, the first select circuit may output the substitution key data when the first calculation control signal may be enabled and may output the calculation key data item when the first calculation control signal may be disabled. The second select circuit may output the first output key data item when the second and third calculation control signals may be disabled, may output the second output key data item when the second calculation control signal may be enabled and the third calculation control signal may be disabled, and may output the third output key data item when the second calculation control signal may be disabled and the third calculation control signal may be enabled. The third select circuit may output the rotation key data when the fourth calculation control signal may be enabled, and may output the rotation key data when the fourth calculation control signal may be disabled.

In exemplary embodiments of the present invention, the output key data items may be J, K or L bits, and the output selector may select the output key data items of J bits from the output key data items to output them as the encryption round key or the decryption round key for each clock cycle.

In exemplary embodiments of the present invention, the key storage unit may further include registers and clock gate circuits.

In exemplary embodiments of the present invention, each of the clock gate circuits may provide the clock signal to a pair of registers or interrupts the supply of the clock signal in response to each of the load enable signals.

In exemplary embodiments of the present invention, the clock gate circuits may provide the clock signal to the registers when the load enable signals may be enabled, and may interrupt the supply of the clock signal to the registers when the load enable signals may be disabled.

In exemplary embodiments of the present invention, parts of the clock gate circuits may be operated when the initial key data items may be J or K bits, and all of the clock gate circuits may be operated when the initial key data items may be L bits.

BRIEF DESCRIPTION OF THE DRAWINGS

Exemplary embodiments of the present invention will become more apparent by describing in detail exemplary embodiments thereof with reference to the attached drawings in which.

DETAILED DESCRIPTION OF THE EXEMPLARY EMBODIMENTS OF THE PRESENT INVENTION

Figure 1:
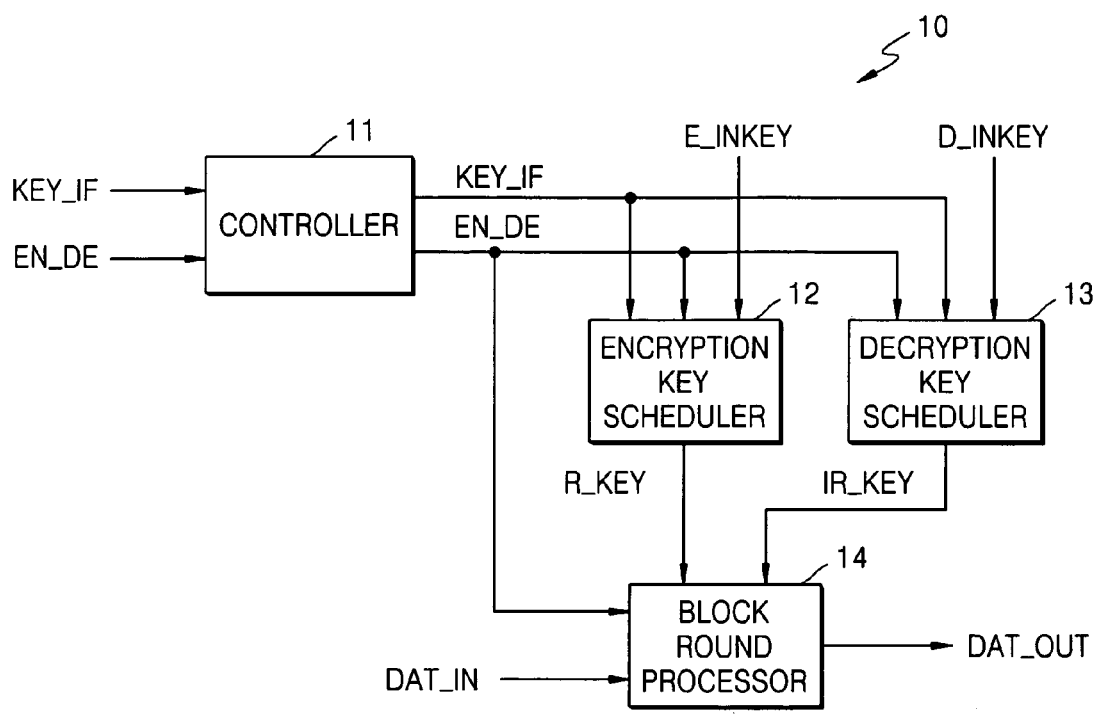
FIG. 1 is a block diagram illustrating an example of a conventional encryption/decryption system, which may use an AES algorithm, that includes a key scheduler.

Exemplary embodiments of the present invention will now be described more fully with reference to the accompanying drawings, in which exemplary embodiments of the invention are shown. The exemplary embodiments of the present invention may, however, be embodied in many different forms and should not be construed as being limited to the exemplary embodiments set forth herein; rather, these exemplary embodiments are provided so that this disclosure will be thorough and complete, and will fully convey the concept of the invention to those skilled in the art. Throughout the drawings, like reference numerals refer to like elements.

Figure 2:
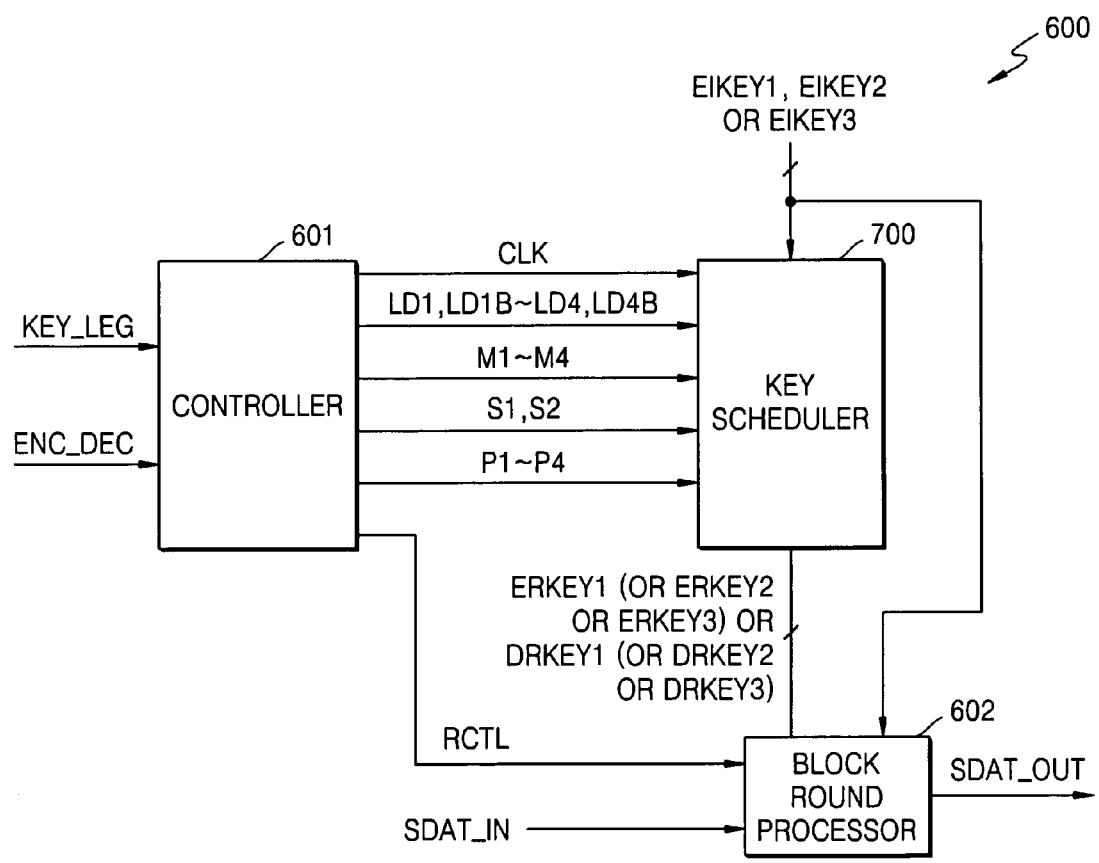
FIG. 2 is a block diagram illustrating an exemplary embodiment of an encryption/decryption system according to the present invention.

FIG. 2 illustrates an exemplary embodiment of an encryption/decryption system 600, which may include a key scheduler 700, according to the present invention. The encryption/decryption system 600 may include a controller 601, a key scheduler 700 and a processor (e.g., a block round processor) 602. The controller 601 may determine the length of an initial round key input to the key scheduler 700 based on an external key information signal KEY_LEG. The controller 601 may determine whether the encryption/decryption system 600 is currently in, for example, an encryption mode or a decryption mode, based on an external mode decision signal ENC_DEC. The controller 601 may output a clock signal CLK, load enable signals LD1, LD1B, LD2, LD2B, LD3, LD3B, LD4 and LD4B, internal select signals M1, M2, M3 and M4, output select signals S1 and S2, calculation control signals P1, P2, P3 and P4, and a round control signal RCTL based on the external mode decision signal ENC_DEC.

The key scheduler 700 may receive one of the first, second, and third initial round keys EIKEY1, EIKEY2, and EIKEY3 from an external apparatus. The lengths of the first, second, and third initial round keys EIKEY1, EIKEY2, and EIKEY3 may be, for example, 128 bits, 192 bits, and 256 bits, respectively. The key scheduler 700 may generate one of the first, second, and third encryption round keys ERKEY1, ERKEY2, and ERKEY3 or one of the first, second, and third decryption round keys DRKEY1, DRKEY2, and DRKEY3, in response to the clock signal CLK, the load enable signals LD1, LD1B, LD2, LD2B, LD3, LD3B, LD4 and LD4B, the internal select signals M1, M2, M3 and M4, the output select signals S1 and S2, and the calculation control signals P1, P2, P3 and P4.

The processor 602 may repeat encryption or decryption rounds and the number of encryption round keys or decryption round keys, which may be generated by the key scheduler 700, may be determined based on the length of an initial round key.

The key scheduler 700 may receive the first initial round key EIKEY1, and may generate, for example, 10 first encryption round keys ERKEY1 or 10 first decryption round keys DRKEY1 for 10 corresponding rounds. The key scheduler 700 may receive the second initial round key EIKEY2, and may generate, for example, 12 second encryption round keys ERKEY2 or 12 second decryption round keys DRKEY2 for 12 rounds. The key scheduler 700 may receive the third initial round key EIKEY3, and may generate, for example, 14 third encryption round keys ERKEY3 or 14 third decryption round keys DRKEY3 for 14 rounds. The processor 602 may process at least one data block, which may be 128 bits, and each of the first, second, and third encryption round keys ERKEY1, ERKEY2, and ERKEY3 or each of the first, second, and third decryption round keys DRKEY1, DRKEY2, and DRKEY3 generated by the key scheduler 700 may be 128 bits.

The processor 602 may receive one of the first, second, and third initial round keys EIKEY1, EIKEY2, and EIKEY3 and one of the first, second, and third encryption round keys ERKEY1, ERKEY2, and ERKEY3 or one of the first, second, and third decryption round keys DRKEY1, DRKEY2, and DRKEY3. The processor 602 may divide input stream data SDAT_IN into data blocks in response to the round control signal RCTL, may mix the data blocks with the received encryption round key ERKEY1 or ERKEY2 or ERKEY3 or decryption round key DRKEY1 or DRKEY2 or DRKEY3 in order to encrypt or decrypt the data blocks, and may output stream data SDAT_OUT.

The processor 602 may repeat the encryption or decryption rounds multiple times, and the key scheduler 700 may generate each encryption round key or decryption round key, which may be used by the processor 602.

Figure 3:
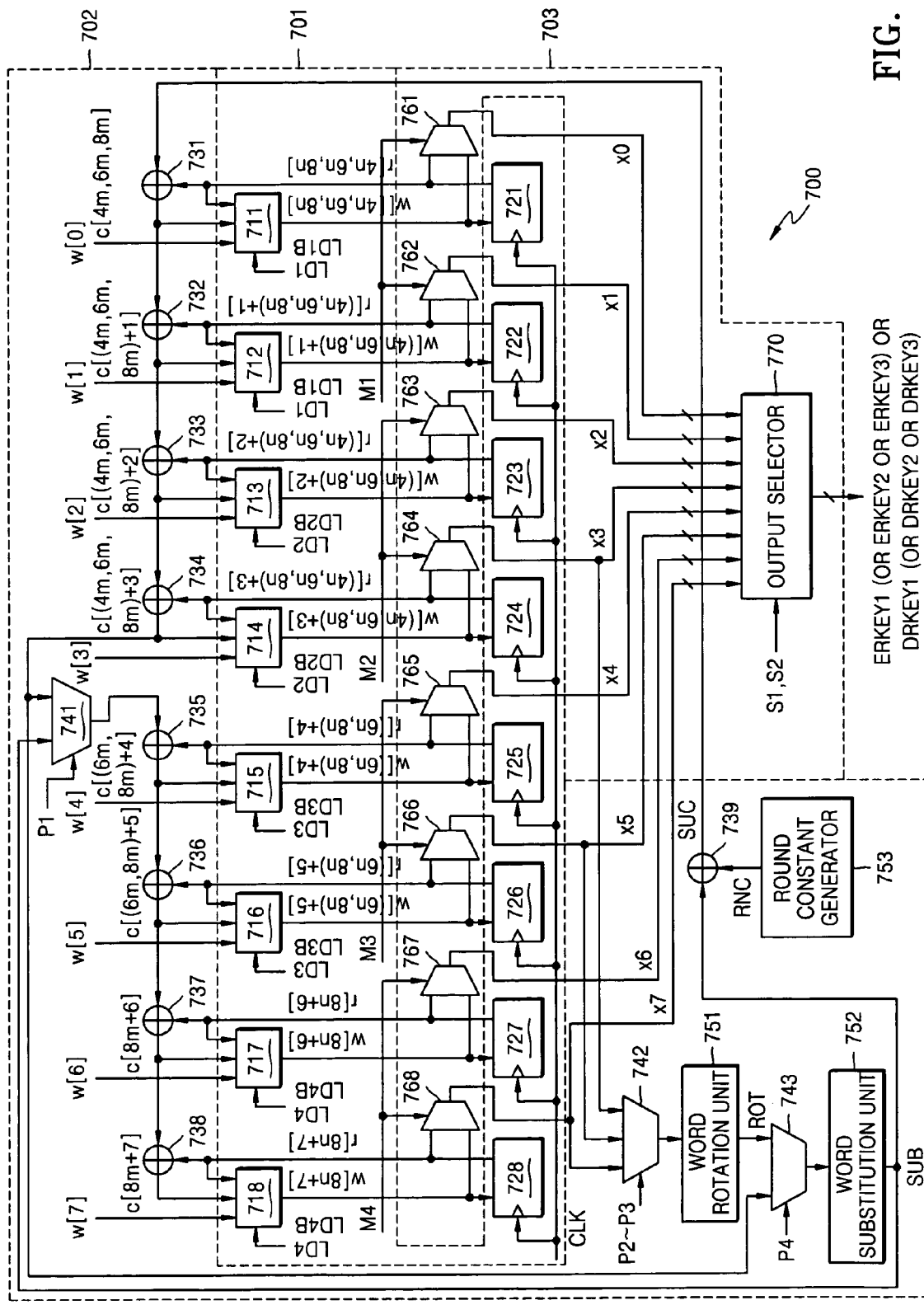
FIG. 3 is a block diagram illustrating an exemplary embodiment of a key scheduler according to the present invention.

FIG. 3 illustrates an exemplary embodiment of the key scheduler according to the present invention. The key scheduler 700 may include a key storage unit 701, a key calculating unit 702, and a key output unit 703.

The key storage unit 701 may include load enable circuits 711 through 718 and registers 721 through 728. The load enable circuits 711 through 718 may select one of initial key data items w[0] through w[7], calculation key data items c[8m] through c[8m+7] (where m may be a natural number), and storage key data items r[8n] through r[8n+7] (where n may be a natural number), in response to the load enable signals LD1, LD1B, LD2, LD2B, LD3, LD3B, LD4 and LD4B and may output the selected data items as input key data items w[8n] through w[8n+7] (where n may be a natural number). The initial key data items w[0] through w[7] may be input to the load enable circuits 711 through 718 and the key calculating unit 702 may not output the calculation key data items c[8m] through c[8m+7].

The number of key data items input to the load enable circuits 711 through 718 may be determined by the initial round key input to the key scheduler 700. The first initial round key EIKEY1 may include initial key data items w[0] through w[3], the second initial round key EIKEY2 may include initial key data items w[0] through w[5], and the third initial round key EIKEY3 may include initial key data items w[0] through w[7]. The first initial round key EIKEY1 may be input to the key scheduler 700, and the initial key data items w[0] through w[3] may be input to the load enable circuits 711 through 714, respectively. The round key EIKEY2 may be input to the key scheduler 700, and the key data items w[0] through w[5] may be input to the load enable circuits 711 through 716, respectively. The third initial round key EIKEY3 may be input to the key scheduler 700, and the key data items w[0] through w[7] may be input to the load enable circuits 711 through 718, respectively.

The pair of the load enable signals LD1 and LD1B may be input to the load enable circuits 711 and 712, respectively, and the pair of the load enable signals LD2 and LD2B may be input to the load enable circuits 713 and 714, respectively.

The pair of the load enable signals LD3 and LD3B may be input to the load enable circuits 715 and 716, respectively, and the pair of the load enable signals LD4 and LD4B may be input to the load enable circuits 717 and 718, respectively.

The registers 721 through 728 may store the input key data items w[8n] through w[8n+7] in response to the clock signal CLK and may output the stored input key data items w[8n] through w[8n+7], for example, as the storage key data items r[8n] through r[8n+7], respectively. The load enable circuits 711 through 718 and the registers 721 through 728 will be explained in more detail later with reference to FIG. 4.

The key calculating unit 702 may include chain calculators 731 through 738, an independent calculator 739, select circuits 741, 742 and 743, a word rotation unit 751, a word substitution unit 752 and a round constant generator 753.

The chain calculators 731 through 738 may be connected (e.g., serially connected) to one another and may be connected to the registers 721 through 728, respectively. The chain calculators 731 through 738 may receive the storage key data items r[8n] through r[8n+7], respectively, from the registers 721 through 728. The chain calculators 731 through 738 may output the calculation key data items c[8m] through c[8m+7] in response to the storage key data items r[8n] through r[8n+7] and conversion key data SUC. The chain calculator 731 may receive the conversion key data SUC and the chain calculators 732 through 738 may receive the calculation key data items c[8m] through c[8m+6], respectively, from the chain calculators 731 through 737. The chain calculators 731 through 738 may perform exclusive-OR operations. The chain calculator 731 may perform an exclusive-OR operation on the storage key data r[8n] and the conversion key data SUC, and may output the calculation key data c[8m]. The chain calculators 732 through 738 may perform exclusive-OR operations on the storage key data items r[8n+1] through r[8n+7] and the calculation key data items c[8m] through c[8m+6], and may output the calculation key data items c[8m+1] through c[8m+7], respectively.

The independent calculator 739 may perform an exclusive-OR operation on a substitution key data SUB and a round constant RNC, and may output the conversion key data SUC.

The select circuit 741 may output one of the substitution key data SUB and the calculation key data c[8m+3] to the chain calculator 735 in response to a calculation control signal P1 from the controller 601. The select circuit 741 may output the substitution key data SUB to the chain calculator 735, for example, when the calculation control signal P1 is enabled, and may output the calculation key data c[8m+3] to the chain calculator 735, for example, when the calculation control signal P1 is disabled.

The select circuit 742 may output at least one of output key data items x3, x5 and x7 to the word rotation unit 751 in response to the calculation control signals P2 and P3, from the controller 601. The select circuit 742 may output the output key data x3 to the word rotation unit 751, for example, when both of the calculation control signals P2 and P3 are disabled. The select circuit 742 may output the output key data x5 to the word rotation unit 751, for example, when the calculation control signal P2 is enabled and the calculation control signal P3 is disabled. The select circuit 742 may output the output key data x7 to the word rotation unit 751, for example, when the calculation control signal P2 is disabled and the calculation control signal P3 is enabled.

The select circuit 743 may output one of the calculation key data c[8m+3] and rotation key data ROT to the word substitution unit 752 in response to the calculation control signal P4, which may be received from the controller 601. The select circuit 743 may output the calculation key data c[8m+3], for example, when the calculation control signal P4 is enabled and may output the rotation key data ROT, for example, when the calculation control signal P4 is disabled. Each of the select circuits 741, 742 and 743 may include a multiplexer.

The word rotation unit 751 may receive one of the output key data items x3, x5 and x7 from the select circuit 742. The word rotation unit 751 may rotate the bits of the received output key data x3, x5, or x7 by, for example, 8 bits and may output the rotation key data ROT. The operation of the word rotation unit 751 may be understood by those skill in the art.

The word substitution unit 752 may receive one of the calculation key data c[8m+3] and the rotation key data ROT from the select circuit 743. The word substitution unit 752 may substitute for the received calculation key data c[8m+3] or rotation key data ROT and may output the substitution key data SUB. The word substitution unit 752 may include four internal substitution tables (not shown). The word substitution unit 752 may substitute for the received calculation key data c[8m+3] or rotation key data ROT, for example, with values from the four substitution tables. The round constant generator 753 may generate the round constant RNC.

The key output unit 703 may include internal select circuits 761 through 768 and an output selector 770. The internal select circuits 761 through 768 may select the input key data items w[8n] through w[8n+7] or the storage key data items r[8n] through r[8n+7] in response to the internal select signals M1, M2, M3 and M4 received from the controller 601, and may output the input key data items w[8n] through w[8n+7] or the storage key data items r[8n] through r[8n+7] as output key data items x0 through x7, respectively. The internal select signal M1 may be input to the internal select circuits 761 and 762, and the internal select signal M2 may be input to the internal select circuits 763 and 764. The internal select signal M3 may be input to the internal select circuits 765 and 766, and the internal select signal M4 may be input to the internal select circuits 767 and 768.

The internal select circuits 761 and 762 may output the input key data items w[8n] and w[8n+1] as the output key data items x0 and x1, respectively, for example, when the internal select signal M1 is enabled. The internal select circuits 761 and 762 may output the storage key data items r[8n] and r[8n+1] as the output key data items x0 and x1, respectively, for example, when the internal select signal M1 is disabled. The internal select circuits 763 through 768 may output the input key data items w[8n+2] through w[8n+7] as the output key data items x3 through x7, respectively, for example, when the internal select signals M2, M3, and M4 are enabled. The internal select circuits 763 through 768 may output the storage key data items r[8n+2] through r[8n+7] as the output key data items x3 through x7, respectively, for example, when the internal select signals M2, M3, and M4 are disabled. Each of the internal select circuits 761 through 768 may include a multiplexer.

The output selector 770 may select a portion of the output key data items x0 through x7 in response to the output select signals S1 and S2 received from the controller 601 and may output the portion of the output key data items x0 through x7 as one of the first, second, and third encryption round keys ERKEY1, ERKEY2, and ERKEY3 or one of the first, second, and third decryption round keys DRKEY1, DRKEY2, and DRKEY3. The output selector 770 will be explained in more detail later with reference to FIG. 5.

Figure 4:
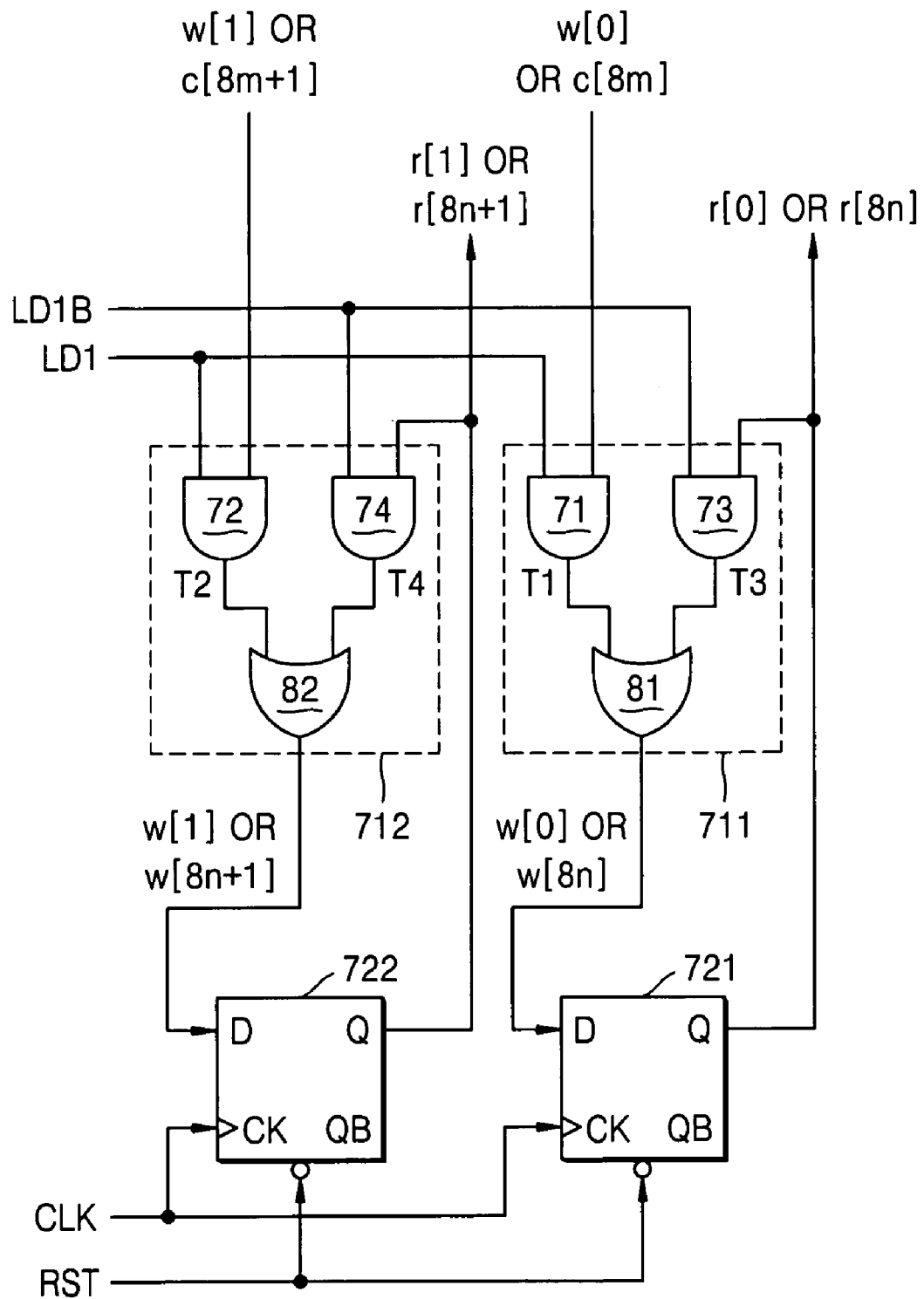
FIG. 4 illustrates exemplary embodiments of load enable circuits and registers of FIG. 3, according to the present invention.

FIG. 4 illustrates exemplary embodiments of the load enable circuits 711 and 712 and the registers 721 and 722. The load enable circuits 713 through 718 may be similar, or substantially similar, to the load enable circuits 711 and 712. The registers 723 through 728 may be similar, or substantially similar, to those of the registers 721 and 722.

Referring to FIG. 4, the load enable circuit 711 may include AND gates 71 and 73 and an OR gate 81, and the load enable circuit 712 may include AND gates 72 and 74 and an OR gate 82. The AND gates 71 and 72 may output logic signals T1 and T2 in response to the load enable signal LD1 and the initial key data items w[0] and w[1] (or, alternatively, the calculation key data items c[8m] and c[8m+1]), respectively. The AND gates 73 and 74 may output logic signals T3 and T4 in response to an inverted load enable signal LD1B and the storage key data items r[0] and r[1] (or, alternatively, r[8n] and r[8n+1]), respectively. The OR gate 81 may output the input key data w[0] (or w[8n]) in response to the logic signals T1 and T3, and the OR gate 82 may output the input key data w[1] (or, alternatively, w[8n+1]) in response to the logic signals T2 and T4.

The load enable signal LD1 may increase to a higher level (e.g., a logic 'High' level or logic '1'), and the AND gates 71 and 72 may output the initial key data items w[0] and [w1] (or, alternatively, the calculation key data items c[8m] and c[8m+1]), respectively, as the logic signals T1 and T2. The inverted load enable signal LD1B may be at a lower level (e.g., a logic 'low' level or logic '0') and the AND gates 73 and 74 may output the logic signals T3 and T4 at a lower level (e.g., a logic 'low' level or logic '0'). The OR gates 81 and 82 may output the logic signals T1 and T2 as the input key data items w[8n] and w[8n+1] (or, alternatively, w[0] and w[1]), respectively.

The load enable signal LD1 may be disabled to a lower level (e.g., a logic 'low' level or logic '0'), and the AND gates 71 and 72 may output the logic signals T1 and T2, respectively, at a lower level (e.g., a logic 'low' level or logic '0'). The inverted load enable signal LD1B may be at a higher level (e.g., a logic 'high' level or logic '1'), and the AND gates 73 and 74 may output the storage key data items r[8n] and r[8n+1] (or r[0] and r[1]) as the logic signals T3 and T4. The OR gates 81 and 82 may output the logic signals T3 and T4, respectively, as the input key data items w[8n] and w[8n+1] (or, alternatively, w[0] and w[1]). The load enable circuits 711 and 712 may output the initial key data items w[0] and w[1] (or, alternatively, the calculation key data items c[8m] and c[8m+1]) as the input key data items w[8n] and w[8n+1], respectively, for example, when the load enable signal LD1 is enabled to a higher level (e.g., a logic 'high' level or logic '1'). The load enable circuits 711 and 712 may output the storage key data items r[8n] and r[8n+1] (or, alternatively, r[0] and r[1]) as the input key data items w[8n] and w[8n+1] (or, alternatively, w[0] and w[1]), respectively, for example, when the load enable signal LD1 is disabled to a lower level (e.g., a logic 'low' level or logic '0').

The output terminals of the load enable circuits 711 and 712 may be connected to the input terminals of the registers 721 and 722, respectively. Each of the registers 721 and 722 may be composed of a D flip-flop. The registers 721 and 722 may store the input key data items w[8n] and w[8n+1], respectively, and may output the stored input key data items w[8n] and w[8n+1] as the storage key data items r[8n] and r[8n+1] in response to the clock signal CLK.

Figure 5:
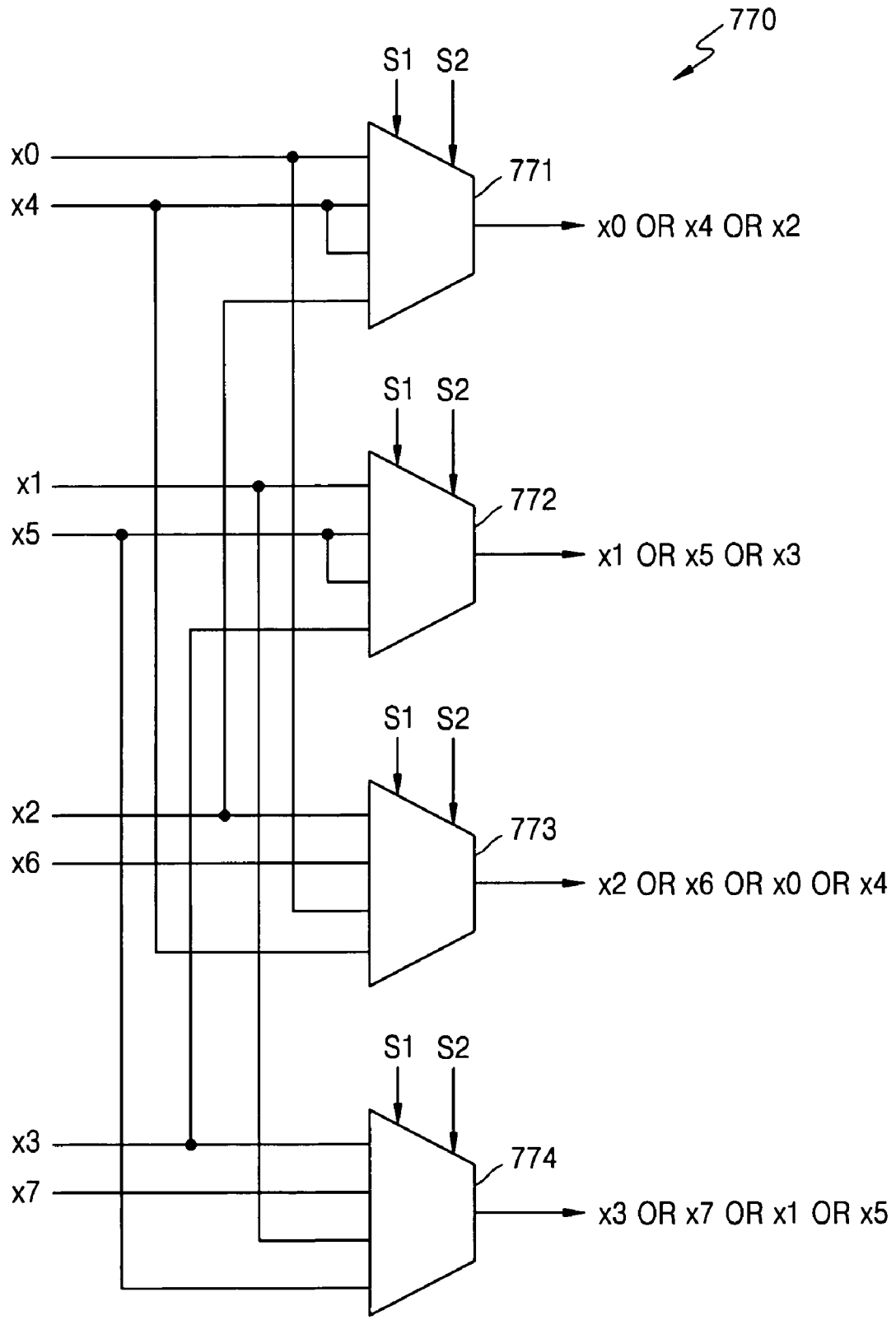
FIG. 5 illustrates an exemplary embodiment of an output selector shown in FIG. 3, according to the present invention.

FIG. 5 illustrates an exemplary embodiment of the output selector 770 shown in FIG. 3. The output selector 770 may include output select circuits 771, 772, 773 and 774. Each of the output select circuits 771, 772, 773 and 774 may include a multiplexer. The output select circuit 771 may select and output at least one of the output key data items x0, x2 and x4 in response to the output select signals S1 and S2 received from the controller 601. The output select circuit 771 may output the output key data x0, for example, when both of the output select signals S1 and S2 are disabled and may output the output key data x4, for example, when one of the output select signals S1 and S2 is enabled. The output select circuit 771 may output the output key data x2, for example, when both of the output select signals S1 and S2 are enabled.

The output select circuit 772 may select and output one of the output key data items x1, x3 and x5 in response to the output select signals S1 and S2. The output select circuit 772 may output the output key data x1, for example, when both of the output select signals S1 and S2 are disabled and may output the output key data x5, for example, when one of the output select signals S1 and S2 is enabled. The output select circuit 772 may output the output key data x3, for example, when both of the output select signals S1 and S2 are enabled.

The output select circuit 773 may select and output one of the output key data items x0, x2, x4 and x6 in response to the output select signals S1 and S2. The output select circuit 773 may output the output key data x2, for example, when both of the output select signals S1 and S2 are disabled and may output the output key data x6, for example, when the output select signal S1 is enabled and the output select signal S2 is disabled. The output select circuit 773 may output the output key data x0, for example, when the output select signal S1 is disabled and the output select signal S2 is enabled and may output the output key data x4, for example, when both of the output select signals S1 and S2 are enabled.

The output select circuit 774 may select and output at least one of the output key data items x1, x3, x5 and x7 in response to the output select signals S1 and S2. The output select circuit 774 may output the output key data x3, for example, when both of the output select signals S1 and S2 are disabled and may output the output key data x7, for example, when the output select signal S1 is enabled and the output select signal S2 is disabled. The output select circuit 774 may output the output key data x1, for example, when the output select signal S1 is disabled and the output select signal S2 is enable and may output the output key data x5, for example, when both of the output select signals S1 and S2 are enabled.

As illustrated in FIG. 5, the output select signals S1 and S2 may be input to the output select circuits 771, 772, 773 and 774, however, an output select signal S3 may also be input to the output select circuits 771, 772, 773 and 774. The output select signal S3 may be input to the output select circuits 771, 772, 773 and 774 and the output select circuits 771, 772, 773 and 774 may output corresponding output key data items in response to the output select signals S1 and S2, as described above, for example, when the output select signal S3 is disabled. The output select signal S3 may be enabled, and the output select circuits 771, 772, 773 and 774 need not output the output key data items.

An example of the operation of the key scheduler 700 according to an exemplary embodiment of the present invention will be described with reference to FIG. 3. A process of receiving the first initial round key EIKEY1, which may include the initial key data items w[0], w[1], w[2], and w[3], and generating the first encryption round key ERKEY1 is described.

The first initial round key EIKEY1, including the initial key data items w[0], w[1], w[2], and w[3], may be input to the key scheduler 700, and the load enable signals LD1, LD1B, LD2, and LD2B and the internal select signals M1 and M2 may be enabled and maintained in an enabled state until the key scheduler 700 generates, for example, 10 first encryption round keys ERKEY1$s$. The load enable signals LD3, LD3B, LD4, and LD4B, and the internal select signals M3 and M4, the output select signals S1 and S2, and the calculation control signals P1, P2, P3 and P4 may be maintained in a disabled state until the key scheduler 700 generates, for example, the 10 first encryption round keys ERKEY1$s$. The load enable circuits 711, 712, 713 and 714, the registers 721, 722, 723 and 724 and the chain calculators 731, 732, 733 and 734 may be operated while the key scheduler 700 generates, for example, the 10 first encryption round keys ERKEY1$s$.

The load enable circuits 715, 716, 717 and 718 may output (e.g., continuously output) the storage key data items r[8n+4], r[8n+5], r[8n+6], and r[8n+7] as the input key data items w[8n+4], w[8n+5], w[8n+6] and w[8n+7], respectively, for example, when the load enable signals LD3, LD3B, LD4 and LD4B are disabled. The output signals of the registers 725, 726, 727, and 728 may be maintained and the current consumption by the registers 725, 726, 727 and 728 may be reduced.

The load enable circuits 711, 712, 713 and 714 may output the initial key data items w[0], w[1], w[2], and w[3] as the input key data items w[0], w[1], w[2], and w[3], respectively, in response to the load enable signals LD1, LD1B, LD2, and LD2B. The registers 721, 722, 723, and 724 may receive and store the input key data items w[0], w[1], w[2], and w[3], respectively, in response to the clock signal CLK and may output the stored input key data items w[0], w[1], w[2], and w[3] as the storage key data items r[0], r[1], r[2], and r[3], respectively.

The internal select circuits 761, 762, 763, and 764 may select the input key data items w[0], w[1], w[2], and w[3] and may output the selected input key data items w[0], w[1], w[2], and w[3] as the output key data items x0, x1, x2 and x3, respectively, in response to the internal select signals M1 and M2. The output select signals S1 and S2 may be disabled, and the output selector 770 may output the output key data items x0, x1, x2, and x3, which may be the input key data items w[0], w[1], w[2] and w[3], as the first encryption round key ERKEY1. The processor 602 may not receive the first encryption round key ERKEY1, including the input key data items w[0], w[1], w[2], and w[3] output from the output selector 770, because the processor 602 may directly receive the initial key data items w[0], w[1], w[2], and w[3]. The processor 602 may receive the first encryption round key ERKEY1 output from the output selector 770 in response to the round control signal RCTL.

The select circuit 742 may select and output the output key data x3 in response to the calculation control signals P2 and P3. The word rotation unit 751 may rotate the bits of the output key data x3 and may output the rotation key data ROT. The select circuit 743 may select and output the rotation key data ROT in response to the calculation control signal P4.

The word substitution unit 752 may substitute the rotation key data ROT using, for example, the four substitution tables, and may output the substitution key data SUB. The independent calculator 739 may perform a logic operation on the substitution key data SUB and the round constant RNC received from the round constant generator 753, and may output the conversion key data SUC.

The chain calculator 731 may perform a logic operation on the conversion key data SUC and the storage key data r[0], and may output the calculation key data c[4]. The chain calculator 732 may perform a logic operation on the storage key data r[1] and the calculation key data c[4] received from the chain calculator 731, and may output the calculation key data c[5]. The chain calculator 733 may perform a logic operation on the storage key data r[2] and the calculation key data c[5] received from the second chain calculator 732, and may output the calculation key data c[6]. The chain calculator 734 may perform a logic operation on the storage key data r[3] and the calculation key data c[6] received from the chain calculator 733, and may output the calculation key data c[7]. The load enable circuits 711, 712, 713, and 714 may output the calculation key data items c[4], c[5], c[6], and c[7] as the input key data items w[4], w[5], w[6], and w[7], respectively, in response to the load enable signals LD1, LD1B, LD2, and LD2B.

The internal select circuits 761, 762, 763, and 764 may select the input key data items w[4], w[5], w[6], and w[7], respectively, and may output the input key data items w[4], w[5], w[6], and w[7] as the output key data items x0, x1, x2, and x3 in response to the internal select signals M1 and M2. The output selector 770 may select the output key data items x0, x1, x2, and x3 in response to the output select signals S1 and S2 and may output the output key data items x0, x1, x2, and x3 as the first encryption round key ERKEY1. The key scheduler 700 may generate the first encryption round key ERKEY1 including the output key data items x0, x1, x2, and x3, which may be the input key data items w[4], w[5], w[6], and w[7], for example, during the first cycle of the clock signal CLK. The first encryption round key ERKEY1, which may be the input key data items w[4], w[5], w[6], and w[7], and the initial key data items w[0], w[1], w[2], and w[3] of the first initial round key EIKEY1 may be input to the processor 602, for example, during the first cycle of the clock signal CLK.

The key scheduler 700 may repeat the aforementioned calculations and outputting of the first encryption round key ERKEY1, for example, until the first encryption round key ERKEY1 including the input key data items w[40], w[41], w[42], and w[43], is generated. The first encryption round key ERKEY1, including the input key data items w[40], w[41], w[42], and w[43], may be generated by the key scheduler 700, and the registers 721, 722, 723 and 724 may store the input key data items w[40], w[41], w[42], and w[43], respectively. The stored input key data items w[40], w[41], w[42], and w[43] may be used, for example, when the first decryption round key DRKEY1 is generated and maintained in the storage state. The first encryption round key ERKEY1, which may be generated by the key scheduler 700, may be illustrated in Table 1.

TABLE 1

| Clock cycle | ERKEY1 | | | | | | | |
|---|---|---|---|---|---|---|---|---|
| | x0 | x1 | x2 | x3 | x4 | x5 | x6 | x7 |
| 1 | w[0] | w[1] | w[2] | w[3] | | | | |
| | w[4] | w[5] | w[6] | w[7] | | | | |
| 2 | w[8] | w[9] | w[10] | w[11] | — | — | — | — |
| . | . | . | . | . | | | | |
| . | . | . | . | . | | | | |
| . | . | . | . | . | | | | |
| 10 | w[40] | w[41] | w[42] | w[43] | — | — | — | — |

During a first cycle of the clock signal CLK, the first encryption round key ERKEY1 including the input key data items w[4], w[5], w[6], and w[7] and the initial key data items w[0], w[1], w[2], and w[3] of the first initial round key EIKEY1 may be input to the processor 602.

Figure 6:
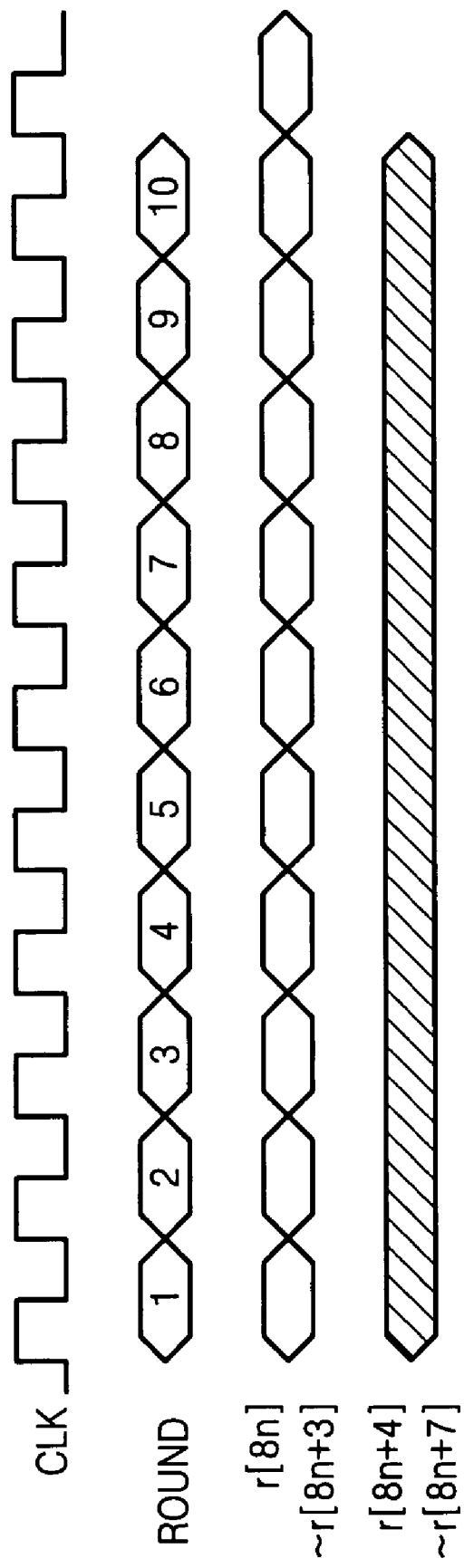
FIG. 6 is an example of a timing diagram illustrating the output timing of the output signals from the registers when the key scheduler of FIG. 3 generates a first encryption round key or a first decryption round key.

FIG. 6 is an example timing diagram illustrating the output timing of the output of the storage key data items r[8n] through r[8n+7] from the registers 721 through 728, respectively, when the key scheduler 700 generates, for example, the 10 first encryption round keys. The storage key data items r[8n], r[8n+1], r[8n+2], and r[8n+3] output from the registers 721, 722, 723, and 724, respectively, may be toggled for each cycle of the clock signal CLK. The storage key data items r[8n+4], r[8n+5], r[8n+6], and r[8n+7] output from the registers 725, 726, 727, and 728, respectively, may be maintained while the key scheduler 700 generates, for example, all, or substantially all, of the 10 first encryption round keys ERKEY1, and current consumed by the registers 725, 726, 727, and 728 may be reduced.

The first decryption round key DRKEY1 may be generated, for example, when the key scheduler 700 receives the first initial round key EIKEY1 including the initial key data items w[0], w[1], w[2], and w[3].

The load enable signals LD1, LD1B, LD2 and LD2B may be enabled and the load enable signals LD3, LD3B, LD4 and LD4B may be disabled. The load enable signals LD1, LD1B, LD2 and LD2B may be maintained in an enabled state and the load enable signals LD3, LD3B, LD4 and LD4B may be maintained in a disabled state, for example, until the key scheduler 700 generates the first decryption round key DRKEY1.

The load enable circuits 711, 712, 713, and 714 may output the initial key data items w[0], w[1], w[2], and w[3] as the input key data items w[0], w[1], w[2], and w[4], respectively, for example, in response to the load enable signals LD1, LD1B, LD2, and LD2B. The registers 721, 722, 723, and 724 may receive and store the input key data items w[0], w[1], w[2], and w[3], respectively, for example, in response to the clock signal CLK and may output the stored input key data items w[0], w[1], w[2], and w[3] as the storage key data items r[0], r[1], w[2], and r[3], respectively.

The key scheduler 700 may repeat the generating of the first encryption round key ERKEY1, for example, until calculation key data items c[40], c[41], c[42], and c[43] are output from the chain calculators 731, 732, 733, and 734, respectively. The key scheduler 700 may repeat the generation, and the processor 602 may not receive the first encryption round key ERKEY1 output from the key scheduler 700, for example, in response to the round control signal RCTL. The key scheduler 700 may repeat the above operations, for example, until the chain calculators 731, 732, 733, and 734 may output the calculation key data items c[40], c[41], c[42], and c[43], respectively, and the output selector 770 may not output the encryption round key ERKEY1.

The chain calculators 731, 732, 733, and 734 may output the calculation key data items c[40], c[41], c[42], and c[43], respectively, the load enable circuits 711, 712, 713, and 714 may output the calculation key data items c[40], c[41], c[42], and c[43] as input key data items w[40], w[41], w[42], and w[43], respectively, for example, in response to the load enable signals LD1, LD1B, LD2, and LD2B. The registers 721, 722, 723, and 724 may receive and store the input key data items w[40], w[41], w[42], and w[43], respectively, for example, in response to the clock signal CLK and may output the store input key data items w[40], w[41], w[42], and w[43] as storage key data items r[40], r[41], r[42], and r[43], respectively. The internal select signals M1 and M2 may be disabled and all, or substantially all, of the calculation control signals P1, P2, P3, and P4 and the output select signals S1 and S2 may be disabled and maintained in a disabled state, for example, until the key scheduler 700 generates the last first decryption round key DRKEY1.

The internal select circuits 761, 762, 763, and 764 may output the storage key data items r[40], r[41], r[42], and r[43] as the output key data items x0, x1, x2, and x3, respectively, for example, in response to the internal select signals M1 and M2. The output selector 770 may select and output the output key data items x0, x1, x2, and x3, which may be i.e the storage key data items r[40], r[41], r[42], and r[43], for example, in response to the output select signals S1 and S2.

The select circuit 742 may output the output key data x3, which may be the storage key data r[43], to the word rotation unit 751, for example, in response to the calculation control signals P2 and P3. The word rotation unit 751 may rotate the bits of the storage key data r[43] to output the rotation key data ROT. The select circuit 743 may select the rotation key data ROT and may output the rotation key data ROT to the word substitution unit 752, for example, in response to the calculation control signal P4. The word substitution unit 752 may substitute for the rotation key data ROT using the substitution tables and may output the substitution key data SUB. The independent calculator 739 may perform a logic operation on the substitution key data SUB and the round constant RNC and may output the conversion key data SUC.

The chain calculator 731 may perform a logic operation on the storage key data r[40] and the conversion key data SUC, and may output the calculation key data c[36]. The chain calculators 732, 733, and 734 may perform logic operation on the storage key data items r[41], r[42], and r[43] and calculation key data items c[36], c[37], and c[38] to output the calculation key data items c[37], c[38], and c[39], respectively. The load enable circuits 711, 712, 713, and 714 may output the calculation key data items c[36], c[37], c[38], and c[39] as input key data items w[36], w[37], w[38], and w[39], respectively, for example, in response to the load enable signals LD1, LD1B, LD2, and LD2B.

The internal select signals M1 and M2 may be enabled and maintained in an enable state, for example, until the key scheduler 700 generates the last first decryption round key DRKEY1. The internal select circuits 761, 762, 763, and 764 may output the input key data items w[36], w[37], w[38], and w[39] as the output key data items x0, x1, x2, and x3, respectively, for example, in response to the internal select signals M1 and M2. The output selector 770 may select the output key data items x0, x1, x2, and x3, for example, in response to the output select signals S1 and S2, and may output the selected output key data items x0, x1, x2, and x3 as the first decryption round key DRKEY1. The key scheduler 700 may generate the first decryption round key DRKEY1 including the output key data items x0, x1, x2, and x3, that is, the input key data items w[36], w[37], w[38], and w[39], for example, during an eleventh cycle of the clock signal CLK. During the eleventh cycle of the clock signal CLK, the first decryption round key DRKEY1, which may be the input key data items w[36], w[37], w[38], and w[39], and the storage key data items r[40], r[41], r[42], and r[43] may be input to the processor 602.

The registers 721, 722, 723, and 724 may receive and store the input key data items w[36], w[37], w[38], and w[39], respectively, in response to the clock signal CLK and may output the stored input key data items w[36], w[37], w[38], and w[39] as storage key data items r[36], r[37], r[38], and r[39], respectively. The key scheduler 700 may repeat the calculations and the outputting of the first decryption round key DRKEY1, for example, until the first decryption round key DRKEY1 including the input key data items w[0], w[1], w[2], and w[3] is generated.

A process of generating the first decryption round key DRKEY1, for example, when the key scheduler 700 may not receive the first initial round key EIKEY1 including the initial key data items w[0], w[1], w[2], and w[3] will now be described.

The registers 721, 722, 723, and 724 may output the stored input key data items w[40], w[41], w[42], and w[43] as the storage key data items r[40], r[41], r[42], and r[43], respectively, for example, in response to the clock signal CLK. The internal select signals M1 and M2 may be disabled and the calculation control signals P1, P2, P3, and P4 and the output select signals S1 and S2 may be disabled and maintained in a disabled state, for example, until the key scheduler 700 generates the last first decryption round key DRKEY1.

The internal select circuits 761, 762, 763, and 764 may output the storage key data items r[40], r[41], r[42], and r[43] as the output key data items x0, x1, x2, and x3, respectively, for example, in response to the internal select signals M1 and M2. The output selector 770 may select and outputs the output key data items x0, x1, x2, and x3, which may be the storage key data items r[40], r[41], r[42], and r[43], for example, in response to the output select signals S1 and S2. Subsequent operations of the key scheduler 700 may be the same, or substantially the same, as the operations of generating the first decryption round key DRKEY1, for example, when the key scheduler 700 receives the first initial round key EIKEY1 including the initial key data items w[0], w[1], w[2] and w[3].

The key scheduler 700 may generate the first decryption round key DRKEY1, and the registers 721, 722, 723 and 724 may store updated input key data items w[4n], w[4n+1], w[4n+2], and w[4n+3], respectively, for each cycle of the clock signal CLK.

The first decryption round key DRKEY1 generated by the key scheduler 700 by clock cycles may be represented, for example, in following table.

TABLE 2

| Clock cycle | DRKEY1 | | | | | | |
|---|---|---|---|---|---|---|---|
| | x0 | x1 | x2 | x3 | x4 | x5 | x6 | x7 |
| 1 | r[40] | r[41] | r[42] | r[43] | — | — | — | — |
|   | w[36] | w[37] | w[38] | w[39] | — | — | — | — |
| 2 | w[32] | w[33] | w[34] | w[35] | — | — | — | — |
| . | . | . | . | . | — | — | — | — |
| . | . | . | . | . | | | | |
| . | . | . | . | . | | | | |
| 10 | w[0] | W[1] | w[2] | w[3] | — | — | — | — |

An example timing diagram illustrating the output timing of the output of storage key data items r[8n] through r[8n+7] from the registers 721 through 728, respectively, for example, when the key scheduler 700 generates the first decryption round key DRKEY1 may be the same, or substantially the same, as the timing diagram shown in FIG. 6. Referring to Table 2 and FIG. 6, the storage key data items r[8n], r[8n+1], r[8n+2], and r[8n+3] output from the registers 721, 722, 723, and 724 may be toggled for each cycle of the clock signal CLK, the storage key data items r[8n+4], r[8n+5], r[8n+6] and r[8n+7] output from the registers 725, 726, 727, and 728 may be maintained while the key scheduler 700 generates the first decryption round key DRKEY1, and the current consumed by the registers 725, 726, 727 and 728 may be reduced.

The key scheduler 700 may receive the second initial round key EIKEY2 including the initial key data items w[0] through w[5], and the second encryption round key ERKEY2 may be generated.

The second initial round key EIKEY2 including the initial key data items w[0] through w[5] may be input to the key scheduler 700, and the load enable signals LD1, LD1B, LD2, LD2B, LD3 and LD3B and the internal select signals M1, M2, and M3 may be enabled. The calculation control signal P2 may be enabled and maintained in the enabled state, for example, until the key scheduler 700 generates the second encryption round key ERKEY2. The calculation control signals P1, P3, and P4 and the load enable signals LD4 and LD4B may be disabled and maintained in a disabled state, for example, until the key scheduler 700 generates the second encryption round key ERKEY2. The load enable circuits 711 through 716, the registers 721 through 726, and the chain calculators 731 through 736 may be operated while the key scheduler 700 generates, for example, 12 second encryption round keys ERKEY2s.

The load enable circuits 717 and 718 may output (e.g., continuously output) the storage key data items r[8n+6] and r[8n+7] as the input key data items w[8n+6] and w[8n+7], respectively, for example, due to the disabling of the load enable signals LD4 and LD4B. The output signals of the registers 727 and 728 may be maintained and current consumption by the registers 727 and 728 may be reduced.

The enable circuits 711 through 716 may output the initial key data items w[0] through w[5] as the input key data items w[0] through w[5], respectively, for example, in response to the load enable signals LD1, LD1B, LD2, LD2B, LD3, and LD3B. The registers 721 through 726 may receive and store the input key data items w[0] through w[5], respectively, for example, in response to the clock signal CLK and may output the stored input key data items w[0] through w[5] as the storage key data items r[0] through r[5], respectively.

The internal select circuits 761 through 766 may select the input key data items w[0] through w[5] and output the input key data items w[0] through w[5] as the output key data items x0 through x5, respectively, for example, in response to the internal select signals M1, M2, and M3.

The select circuit 742 may select the output key data x5, which may be the input key data w[5], for example, in response to the calculation control signals P2 and P3 and may output the output key data x5 to the word rotation unit 751. The word rotation unit 751 may rotate the bits of the input key data w[5] and may output the rotation key data ROT. The select circuit 743 may select the rotation key data ROT, for example, in response to the calculation control signal P4 and may output it to the word substitution unit 752. The word substitution unit 752 may substitute for the rotation key data ROT and may output the substitution key data SUB. The independent calculator 739 may perform a logic operation on the substitution key data SUB and the round constant RNC, and may output the conversion key data SUC.

The chain calculator 731 may perform a logic operation on the conversion key data SUC and the storage key data r[0] and may output the calculation key data c[6]. The chain calculator 732 may perform a logic operation on the storage key data r[1] and the calculation key data c[6] received from the chain calculator 731, and may output the calculation key data c[7]. The chain calculator 733 may perform a logic operation for the storage key data r[2] and the calculation key data c[7] received from the chain calculator 732 and may output the calculation key data c[8]. The chain calculator 734 may perform a logic operation on the storage key data r[3] and the calculation key data c[8] received from the chain calculator 733, and may output the calculation key data c[9]. The select circuit 741 may output the calculation key data c[9] to the chain calculator 735, for example, in response to the calculation control signal P1. The chain calculators 735 and 736 may perform operations on the storage key data items r[4] and r[5] and the calculation key data items c[9] and c[10], and may output the calculation key data items c[10] and c[11], respectively.

The load enable circuits 711 through 716 may output the calculation key data items c[6] through c[11] as the input key data items w[6] through w[11], respectively, for example, due to the enabling of the load enable signals LD1, LD1B, LD2, LD2B, LD3 and LD3B.

The internal select signal M1 may be maintained in an enabled state and the internal select signals M2 and M3 may be disabled. The internal select circuits 761 and 762 may output the input key data items w[6] and w[7] as the output key data items x0 and x1, respectively, for example, in response to the internal select signal M1. The internal select circuits 763, 764, 765, and 766 may output the storage key data items r[2], r[3], r[4], and r[5] as the output key data items x2, x3, x4, and x5 respectively, for example, in response to the internal select signals M2 and M3.

The output select signal S2 may be enabled and the output select signal S2 may be disabled. The output selector 770 may select the output key data items x4, x5, x0, and x1 from the output key data items x0 through x7, for example, in response to the output select signals S1 and S2 and may output them as the second encryption round key ERKEY2. The key scheduler 700 may generate the second encryption round key ERKEY2 including the output key data items x0 and x1, which may be the input key data items w[6] and w[7], and the output key data items x4 and x5, which may be the storage key data items r[4] and r[5], for example, during the first cycle of the clock signal CLK. During the first cycle of the clock signal CLK, the second encryption round key ERKEY2 and the initial key data items w[0] through w[5] of the second initial round key EIKEY2 may be input to the processor 602. The storage key data items r[4] and r[5] of the second encryption round key ERKEY2 may be the same, or substantially the same to the initial key data items w[4] and w[5], the processor 602 may not receive the storage key data items r[4] and r[5]. The processor 602 may receive the second encryption round key ERKEY2 including the input key data items w[6] and w[7] and the initial key data items w[0] through w[5].

The registers 721 through 726 may store the input key data items w[6] through w[11], respectively, in response to the clock signal CLK and output the stored input key data items w[6] through w[11] as the storage key data items r[6] through r[11], respectively.

The load enable signals LD1, LD1B, LD2, LD2B, LD3, and LD3B and the internal select signals M1, M2, and M3 may be disabled and the output select signals S1 and S2 may be enabled. The load enable circuits 711 through 716 may output (e.g., continuously output) the storage key data items r[6] through r[11] as the input key data items w[6] through w[11], respectively, for example, in response to the load enable signals LD1, LD1B, LD2, LD2B, LD3, and LD3B. The internal select circuits 761 through 766 may output the storage key data items r[6] through r[11] as the output key data items x0 through x5, respectively, in response to the internal select signals M1, M2, and M3.

The output selector 770 may select the output key data items x2, x3, x4 and x5 in response to the output select signals S1 and S2 and may output the output key data items x2, x3, x4, and x5 as the second encryption round key ERKEY2. The key scheduler 700 may generate the second encryption round key ERKEY2 including the output key data items x2, x3, x4, and x5, that is, the storage key data items r[8], r[9], r[10], and r[11], for example, during the second cycle of the clock signal CLK.

The load enable signals LD1, LD1B, LD2, LD2B, LD3, and LD3B may be enabled. The load enable circuits 711 through 716 may output the calculation key data items c[12] through c[17], respectively, which output from the chain calculators 731 through 736, respectively, as the input key data items w[12] through w[17] in response to the load enable signals LD1, LD1B, LD2, LD2B, LD3, and LD3B.

The key scheduler 700 may repeat the aforementioned calculating operations and the operation of outputting the second encryption round key ERKEY2, for example, until the calculation key data items c[46] through c[51] may be output from the chain calculators 731 through 736, respectively. The calculation key data items c[46] through c[51] may be output from the chain calculators 731 through 736, respectively, the registers 721 through 726 may store the input key data items w[46] through w[51], respectively, received from the load enable circuits 711 through 716 and may maintain the stored state. The input key data items w[46] through w[51] may be used, for example, when the key scheduler 700 generates the second decryption round key DRKEY2.

The key scheduler 700 may generate the second encryption round key ERKEY2, the registers 721 through 726 may store updated input key data items w[6n] through w[6n+5], respectively, for every two cycles of the clock signal CLK. The second encryption round key ERKEY2 generated by the key scheduler 700 by clock cycles may be represented in the following table.

TABLE 3

| Clock cycle | ERKEY2 | | | | | | |
|---|---|---|---|---|---|---|---|
| | x0 | x1 | x2 | x3 | x4 | x5 | x6 | x7 |
| 1 | w[0] | w[1] | w[2] | w[3] | | | — | — |
| | w[6] | w[7] | — | — | w[4] | w[5] | — | — |
| 2 | — | — | r[8] | r[9] | r[10] | r[11] | — | — |
| . | . | . | . | . | . | . | | |
| . | . | . | . | . | . | . | | |
| . | . | . | . | . | . | . | | |
| 12 | — | — | w[48] | w[49] | w[50] | w[51] | — | — |

Figure 7A:
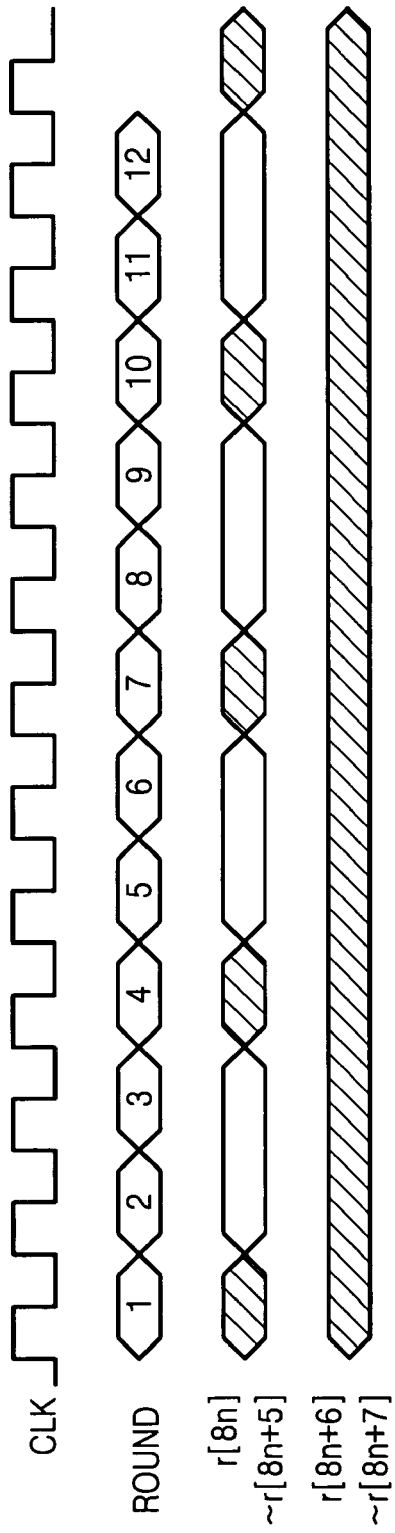
FIGS. 7a and 7b are example timing diagrams illustrating the output timing of the output signals from the registers when the key scheduler of FIG. 3 generates a second encryption round key or a second decryption round key.

FIG. 7a is an example timing diagram illustrating the output timing of the output of the storage key data items r[8n] through r[8n+7] from the registers 721 through 728, respectively, for example, when the key scheduler 700 generates the second encryption round key ERKEY2. Referring to Table 3 and FIG. 7a, the storage key data items r[8n] through r[8n+5] output from the registers 721 through 726, respectively, may be toggled, for example, every two cycles of the clock signal CLK. The storage key data items r[8n+6] and r[8n+7] output from the registers 727 and 728, respectively, may be maintained, for example, while the key scheduler 700 generates the second encryption round key ERKEY2. The current consumption by the registers 727 and 728 may be reduced.

The second initial round key EIKEY2 including the initial key data items w[0] through w[5] may be input to the key scheduler 700, and the load enable signals LD1, LD1B, LD2, LD2B, LD3, and LD3B may be enabled. The calculation control signal P2 may be enabled and maintained in the enabled state, for example, until the key scheduler 700 generates the second decryption round key DRKEY2. The calculation control signals P1, P3, and P4 and the load enable signals LD4 and LD4B may be disabled and maintained in the disabled state, for example, until the key scheduler 700 generates the second decryption round key DRKEY2. The load enable circuits 711 through 716, the registers 721 through 726 and the chain calculators 731 through 736 may be operated while the key scheduler 700 generates, for example, 12 second decryption round keys DRKEY2s.

The load enable circuits 711 through 716 output the initial key data items w[0] through w[5] respectively, as the input key data items w[0] through w[5], for example, in response to the load enable signals LD1, LD1B, LD2, LD2B, LD3, and LD3B. The registers 721 through 726 may store the input key data items w[0] through w[5], respectively, in response to the clock signal CLK and may output the stored input key data items w[0] through w[5] as the storage key data items r[0] through r[5] respectively. The key scheduler 700 may repeat the calculating operation and may generate the second encryption round key ERKEY2, for example, until calculation key data items c[46] through c[51] are output from the chain calculators 731 through 736, respectively.

The processor 602 may not receive the second encryption round key ERKEY2 output from the key scheduler 700 in response to the round control signal RCTL while the chain calculators 731 through 736 may output calculation key data items c[46] through c[51], respectively. The output selector 770 may not output the second encryption round key ERKEY2, for example, while the key scheduler 700 repeats the calculating operation for generating the second decryption round key DRKEY2 until the calculation key data items c[46] through c[51] are output from the chain calculators 731 through 736, respectively.

The calculation key data items c[46] through c[51] may be output from the chain calculators 731 through 736, respectively, and the load enable signals LD1, LD1B, LD2, LD2B, LD3 and LD3B may be enabled. The load enable circuits 711 through 716 may output the calculation key data items c[46] through c[51], respectively, as input key data items w[46] through w[51], for example, in response to the load enable signals LD1, LD1B, LD2, LD2B, LD3 and LD3B. The registers 721 through 726 may receive and store the input key data items w[46] through w[51], for example, in response to the clock signal CLK and may output the stored input key data items w[46] through w[51] as storage key data items r[46] through r[51], respectively.

The internal select signals M1, M2 and M3 may be disabled and the output select signals S1, S2, and S3 may be enabled. The internal select circuits 761 through 766 may output the storage key data items r[46] through r[51] as the output key data items x0 through x5, respectively, for example, in response to the internal select signals M1, M2 and M3. The output selector 770 may select and output the output key data items x2, x3, x4, and x5 (that is, the storage key data items r[48], r[49], r[50], and r[51]), for example, in response to the output select signals S1 and S2. The select circuit 742 may select the output key data x5 (that is, the storage key data r[51]), for example, in response to the calculation control signals P2 and P3 and may output it to the word rotation unit 751. The word rotation unit 751 may rotate the bits of the storage key data r[51] to output the rotation key data ROT. The select circuit 743 may select the rotation key data ROT, for example, in response to the calculation control signal P4 to output it to the word substitution unit 752. The word substitution unit 752 may substitute for the rotation key data ROT and may output the substitution key data SUB. The independent calculator 739 may perform a logic operation on the substitution key data SUB and the round constant RNC and may output the conversion key data SUC.

The chain calculator 731 may perform a logic operation on the conversion key data SUC and the storage key data r[46] and may output the calculation key data c[40]. The chain calculators 732, 733 and 734 may perform logic operations on the storage key data items r[47], r[48] and r[49] and the calculation key data items c[40], c[41] and c[42], respectively, and may output the calculation key data items c[41], c[42], and c[43], respectively. The select circuit 741 may output the calculation key data c[43] to the calculator 735, for example, in response to the calculation control signal P1. The chain calculator 735 may perform a logic operation on the calculation key data c[43] and the storage key data r[50] and may output the calculation key data c[44]. The chain calculator 736 may perform a logic operation on the calculation key data c[44] and the storage key data r[51] and may output the calculation key data c[45].

The load enable circuits 711 through 716 may output the calculation key data items c[40] through c[45] as the input key data items w[40] through w[45], respectively, because the load enable signals LD1, LD1B, LD2, LD2B, LD3, and LD3B may be enabled.

The internal select signal M3 may be enabled and the internal select signals M1 and M2 may be disabled. The output select signal S1 may be disabled and the output select signal S2 may be enabled. The internal select circuits 765 and 766 may output the input key data items w[44] and w[45] as the output key data items x4 and x5, respectively, in response to the internal select signal M3. The internal select circuits 761, 762, 763, and 764 may output the storage key data items r[46], r[47], r[48], and r[49] as the output key data items x0, x1, x2, and x3, respectively, in response to the internal select signals M1 and M2. The output selector 770 may select the output key data items x4, x5, x0, and x1 in response to the output select signals S1 and S2 and may output the output key data items x4, x4, x0, and x1 as the second decryption round key DRKEY2. The key scheduler 700 may generate the second decryption round key DRKEY2 including the output key data items x4, x5, x0, and x1, that is, the storage key data items r[46], r[47] and the input key data items w[44] and w[45] during a thirteenth cycle of the clock signal CLK. During the thirteenth cycle of the clock signal CLK, the second decryption round key DRKEY2 including the storage key data items r[46], r[47] and the input key data items w[44] and w[45] and the storage key data items r[48], r[49], r[50], and r[51] may be input to the processor 602.

The registers 721 through 726 may store the input key data items w[40] through w[45], respectively, in response to the clock signal CLK and may output the stored input key data items w[40] through w[45] as the storage key data items r[40] through r[45], respectively.

The internal select signals M1, M2, and M3 may be disabled, and the load enable signals LD1, LD1B, LD2, LD2B, LD3, and LD3B and the output select signals S1 and S2 may be disabled. The internal select circuits 761 through 766 may be output the storage key data items r[40] through r[45] as the output key data items x0 through x7, respectively, in response to the internal select signals M1, M2 and M3. The output selector 770 may select the output key data items x0, x1, x2, and x3 in response to the output select signals S1 and S2 and may output them as the second decryption round key DRKEY2. The key scheduler 700 may generate the second decryption round key DRKEY2 including the output key data items x0, x1, x2 and x3, that is, the storage key data items r[40], r[41], r[42], and r[43] during a fourteenth cycle of the clock signal CLK, and the load enable signals LD1, LD1B, LD2, LD2B, LD3, and LD3B may be enabled.

The key scheduler 700 may repeat the calculating operations and the operation of outputting the second decryption round key DRKEY2, for example, until the calculation key data items c[0] through c[5] may be output from the chain calculators 731 through 736, respectively.

The key scheduler 700 may not receive the second initial round key EIKEY2 including the initial key data items w[0] through w[5] and the second decryption round key DRKEY2 may be generated.

The first through sixth registers 721 through 726 may output the input key data items w[46] through w[51], previously stored therein, as the storage key data items r[46] through r[51], respectively.

The internal select signals M1, M2 and M3 may be disabled and the output select signals S1 and S2 may be enabled. The internal select circuits 761 through 766 may be output the storage key data items r[46] through r[51] as the output key data items x0 through x5, respectively, in response to the internal select signals M1, M2 and M3. The output selector 770 may select and output the output key data items x2, x3, x4, and x5 (that is, the storage key data items r[48], r[49], r[50], and r[51]) in response to the output select signals S1 and S2. Subsequent operations of the key scheduler 700 may be the same, or substantially the same, as the corresponding operations of generating the second decryption round key DRKEY2, for example, when the key scheduler 700 receives the initial round key EIKEY2 including the initial key data items w[0] through w[5].

The key scheduler 700 may generate the second decryption round key DRKEY2, and the registers 721 through 726 may store updated input key data items w[6n] through w[6n+5], respectively, for every two cycles of the clock signal CLK. The decryption round key DRKEY2 may be generated by the key scheduler 700 by clock cycles may be represented in the following table.

TABLE 4

| Clock cycle | DRKEY2 | | | | | | |
|---|---|---|---|---|---|---|---|
| | x0 | x1 | x2 | x3 | x4 | x5 | x6 x7 |
| 1 | — | — | r[48] | r[49] | r[50] | r[51] | — — |
| | r[46] | r[47] | — | — | w[44] | w[45] | — — |
| 2 | r[40] | r[41] | r[42] | r[43] | — | — | — — |
| . | . | . | . | . | . | | |
| . | . | . | . | . | | | |
| . | . | . | . | . | | | |
| 12 | r[0] | r[1] | r[2] | r[3] | — | — | — — |

Figure 7B:
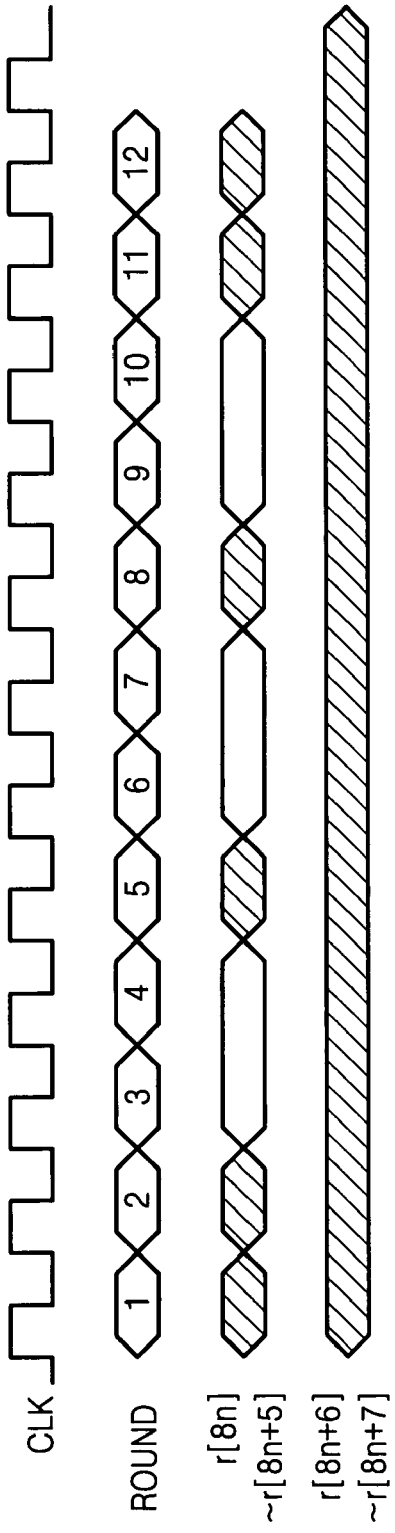

FIG. 7b is an example of a timing diagram of the storage key data items r[8n] through r[8n+7] output from the registers 721 through 728, for example, when the key scheduler 700 generates the second decryption round key DRKEY2. Referring to Table 4 and FIG. 7b, the storage key data items r[8n] through r[8n+5] output from the registers 721 through 726, respectively, may be toggled for every two cycles of the clock signal CLK. The storage key data items r[8n+6] and r[8n+7] output from the registers 727 and 728, respectively, may not be toggled, for example, while the key scheduler 700 generates the second decryption round key DRKEY2, and the current consumption by the registers 727 and 728 may be reduced.

The key scheduler 700 may receive the initial round key EIKEY3 including the initial key data items w[0] through w[7], and may generate the third encryption round key ERKEY3. The initial round key EIKEY3 including the initial key data items w[0] through w[7] may be input to the key scheduler 700, and the load enable signals LD1, LD1B, LD2, LD2B, LD3, LD3B, LD4, and LD4B and the internal select signals M1, M2, M3, and M4 may be enabled.

The load enable circuits 711 through 718 may output the initial key data items w[0] through w[7] as the input key data items w[0] through w[7], respectively, in response to the load enable signals LD1, LD1B, LD2, LD2B, LD3, LD3B, LD4 and LD4B. The internal select circuits 761 through 768 may output the input key data items w[0] through w[7] as the output key data items x0 through x7, respectively, in response to the internal select signals M1, M2, M3, and M4. The registers 721 through 728 may receive and store the input key data items w[0] through w[7], respectively, and may output the input key data items w[0] through w[7] as the storage key data items r[0] through r[7], respectively, in response to the clock signal CLK.

The calculation control signals P2 and P4 may be disabled and the calculation control signal P3 may be enabled. The select circuit 742 may select the output key data x7 (that is, the input key data w[7]) and may output it to the word rotation unit 751 in response to the calculation control signals P2 and P3. The word rotation unit 751 may rotate the bits of the storage key data r[7] and may output the rotation key data ROT. The select circuit 743 may select the rotation key data ROT and may output it to the word substitution unit 752 in response to the calculation control signal P4. The word substitution unit 752 may substitute the rotation key data ROT by a value to output the substitution key data SUB. The independent calculator 739 may perform a logic operation on the substitution key data SUB and the round constant RNC and may output the conversion key data SUC.

The chain calculator 731 may perform a logic operation for the conversion key data SUC and the storage key data r[0] and may output the calculation key data c[8]. The chain calculators 732, 733 and 734 may perform logic operations on the storage key data items r[1], r[2], and r[3] and the calculation key data items c[8], c[9], and c[10] and may output the calculation key data items c[9], c[10] and c[11], respectively.

The load enable signals LD1, LD1B, LD2 and LD2B and the internal select signals M1 and M2 may be enabled, and the load enable signals LD3, LD3B, LD4, and LD4B and the internal select signals M3 and M4 may be disabled. The output select signals S1 and S2 may be disabled and the calculation control signals P1 and P4 may be enabled.

The load enable circuits 711, 712, 713, and 714 may output the calculation key data items c[8], c[9], c[10], and c[11] as the input key data items w[8], w[9], w[10] and w[11], respectively, in response to the load enable signals LD1, LD1B, LD2 and LD2B. The load enable circuits 715, 716, 717, and 718 may output (e.g., continuously output) the storage key data items r[4], r[5], r[6], and r[7] as the input key data items w[4], w[5], w[6], and w[7], respectively, in response to the load enable signals LD3, LD3B, LD4, and LD4B. The internal select circuits 761, 762, 763 and 764 may select the input key data items w[8], w[9], w[10], and w[11], respectively, in response to the internal select signals M1 and M2 and may output them as the output key data items x0, x1, x2, and x3, respectively. The output selector 770 may select the output key data items x0, x1, x2, and x3 in response to the output select signals S1 and S2 and may output them as the third encryption round key ERKEY3. The key scheduler 700 may generate the third encryption round key ERKEY3 including the output key data items x0, x1, x2, and x3, that is, the input key data items w[8], w[9], w[10], and w[11] during the second cycle of the clock signal CLK. During the first cycle of the clock signal CLK, the initial key data items w[0] through w[7] of the initial round key EIKEY3 may be directly input to the processor 602 from an external apparatus, as shown in FIG. 2.

The select circuit 743 may select the calculation key data c[11] in response to the calculation control signal P4 and may output it to the word substitution unit 752. The word substitution unit 752 may substitute the calculation key data c[11] by a value and may output the substitution key data SUB. The select circuit 741 may output the substitution key data SUB to the chain calculator 735 in response to the calculation control signal P1.

The chain calculator 735 may perform a logic operation on the storage key data r[4] and the substitution key data SUB and may output the calculation key data c[12]. The chain calculators 736, 737, and 738 may perform logic operations on the storage key data items r[5], r[6], and r[7] and the calculation key data items c[12], c[13], and c[14] and may output the calculation key data items c[13], c[14] and c[15], respectively.

The load enable signals LD3, LD3B, LD4 and LD4B, the internal select signals M3 and M4 and the output select signal S1 may be enabled. The load enable signals LD1, LD1B, LD2, and LD2B, the internal select signals M1 and M2 and the output select signal S2 may be disabled. The load enable circuits 715, 716, 717 and 718 may output the calculation key data items c[12], c[13], c[14], and c[15] as the input key data items w[12], w[13], w[14] and w[15], respectively, in response to the load enable signals LD3, LD3B, LD4, and LD4B. The internal select circuits 765, 766, 767, and 768 may select the input key data items w[12], w[13], w[14], and w[15] in response to the internal select signals M3 and M4 and output them as the output key data items x4, x5, x6, and x7, respectively. The output selector 770 may select the output key data items x4, x5, x6, and x7 in response to the output select signals S1 and S2 and may output them as the third encryption round key ERKEY3. The key scheduler 700 may generate the third encryption round key ERKEY3 including the output key data items x4, x5, x6, and x7, that is, the input key data items w[12], w[13], w[14], and w[15] during the cycle of the clock signal CLK.

The registers 721 through 728 may store the input key data items w[8] through w[15], respectively, in response to the clock signal CLK, and may output the stored input key data items w[8] through w[15] as the storage key data items r[8] through r[15], respectively. The key scheduler 700 may repeat the calculating operation and the outputting the third encryption round key ERKEY3, for example, until calculation key data items c[52] through c[59] may be output from the chain calculators 731 through 738, respectively.

The calculation key data items c[52] through c[59] may be output from the chain calculators 731 through 738, respectively, and the registers 721 through 728 may store the input key data items w[52] through w[59], respectively, which may be received from the load enable circuits 711 through 718, respectively, and maintained in the stored state. The input key data items w[52] through w[59] may be used when the key scheduler 700 generates the third decryption round key DRKEY3.

The key scheduler 700 may generate the third encryption round key ERKEY3, and the registers 721 through 724 and the registers 725 through 728 may store updated (e.g., alternately updated) calculation key data items c[8n] through c[8n+3] and c[8n+4] through c[8n+7], respectively, for each cycle of the clock signal CLK other than the first cycle. The word substitution unit 752 may substitute, for example, once during one cycle of the clock signal CLK, and the word substitution unit 752 may include four substitution tables. The third encryption round key ERKEY3 may be generated by the key scheduler 700 by clock cycles, which may be represented in the following table.

TABLE 5

| Clock cycle | ERKEY3 | | | | | | | |
|---|---|---|---|---|---|---|---|---|
| | x0 | x1 | x2 | x3 | x4 | x5 | x6 | x7 |
| 1 | w[0] | w[1] | w[2] | w[3] | — | — | — | — |
| | | | | | w[4] | w[5] | w[6] | w[7] |
| 2 | w[8] | w[9] | w[10] | w[11] | — | — | — | — |
| . | . | . | . | . | . | . | . | . |
| . | . | . | . | . | . | . | . | . |
| . | . | . | . | . | . | . | . | . |
| 14 | w[56] | w[57] | w[58] | w[59] | — | — | — | — |

Figure 8A:
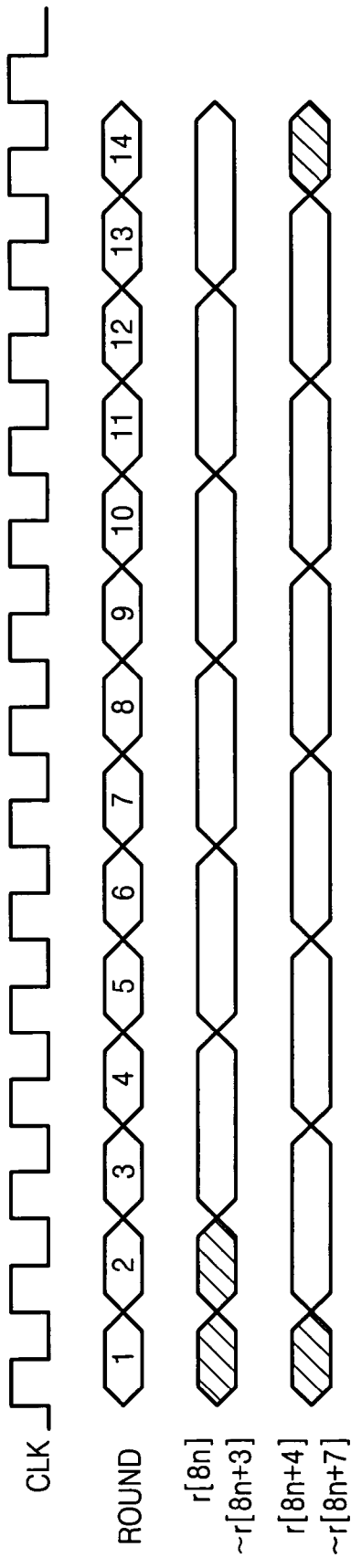
FIGS. 8a and 8b are example timing diagrams illustrating the output timing of the output signals from the registers when the key scheduler of FIG. 3 generates a third encryption round key or a third decryption round key.

FIG. 8a is an example of a timing diagram of the storage key data items r[8n] through r[8n+7] output from the registers 721 through 728 when the key scheduler 700 generates the third encryption round key ERKEY3. Referring to Table 5 and FIG. 8a, the storage key data items r[8n], r[8n+1], r[8n+2], and r[8n+3] output from the registers 721, 722, 723, and 724 and the storage key data items r[8n+4], r[8n+5], r[8n+6] and r[8n+7] output from the registers 725, 726, 727 and 728 ma be toggled (e.g., alternately toggled) for each cycle of the clock signal CLK.

The key scheduler 700 may receive the initial round key EIKEY3 including the initial key data items w[0] through w[7], and the encryption round key DRKEY3 may be generated.

The third initial round key EIKEY3 including the initial key data items w[0] through w[7] may be input to the key scheduler 700, and the load enable signals LD1, LD1B, LD2, LD2B, LD3, LD3B, LD4, and LD4B may be enabled. The load enable circuits 711 through 718 may output the initial key data items w[0] through w[7] as the input key data items w[0] through w[7], respectively, in response to the load enable signals LD1, LD1B, LD2, LD2B, LD3, LD3B, LD4, and LD4B. The registers 721 through 728 may store the input key data items w[0] through w[7], respectively, in response to the clock signal CLK and may output the stored input key data items w[0] through w[7] as the storage key data items r[0] through r[7], respectively.

The key scheduler 700 may repeat the aforementioned calculating operation for generating the third encryption round key ERKEY3, for example, until the calculation key data items c[52] through c[59] may be output from the chain calculators 731 through 738, respectively. The key scheduler 700 may repeat the calculating operation, for example, until the calculation key data items c[52] through c[59] may be output from the chain calculators 731 through 738, respectively, the processor 602 may not receive the third encryption round key ERKEY3, output from the key scheduler 700, in response to the round control signal RCTL. The output selector 770 may not output the third encryption round key ERKEY3, for example, while the key scheduler 700 repeats the calculating operation, as described above with reference to FIG. 5.

The calculation key data items c[52] through c[59] may be output from the chain calculators 731 through 738, respectively, and the load enable circuits 711 through 718 may output the calculation key data items c[52] through c[59] as the input key data items w[52] through w[59], respectively, in response to the load enable signals LD1, LD1B, LD2, LD2B, LD3, LD3B, LD4, and LD4B. The registers 721 through 728 may receive and store the input key data items w[52] through w[59], respectively, in response to the clock signal CLK, and may output the stored input key data items w[52] through w[59] as the storage key data items r[52] through r[59], respectively.

The internal select signals M1, M2, M3, and M4 and the calculation control signals P2 and P4 may be disabled and the calculation control signal P3 may be enabled. The output select signal S1 may be enabled and the output select signal S2 may be disabled. The internal select circuits 761 through 768 may output the storage key data items r[52] through r[59] as the output key data items x0 through x7, respectively, in response to the internal select signals M1, M2, M3 and M4. The output selector 770 may select and output the output key data items x4, x5, x6, and x7 (that is, the storage key data items r[56], r[57], r[58] and r[59] in response to the output select signals S1 and S2.

Both of the output select signals S1 and S2 may be disabled. The output selector 770 may select and output the output key data items x0, x1, x2, and x3 (that is, the storage key data items r[52], r[53], r[54] and r[55]) in response to the output select signals S1 and S2. The key scheduler 700 may generate the third decryption round key DRKEY3 including the output key data items x0, x1, x2 and x3, that is, the storage key data items r[52], r[53], r[54], and r[55], for example, during a fifteenth cycle of the clock signal CLK. During the fifteenth cycle of the clock signal CLK, the third decryption round key DRKEY3 including the storage key data items r[52], r[53], r[54], and r[55] and the storage key data items r[56], r[57], r[58], and r[59] may be input to the processor 602.

The select circuit 742 may select the output key data x7 (that is, the storage key data r[59]) and may output it to the word rotation unit 751 in response to the calculation control signals P2 and P3. The word rotation unit 751 may rotate the bits of the storage key data r[59], and may output the rotation key data ROT. The select circuit 743 may select the rotation key data ROT, and may output it to the word substitution unit 752 in response to the calculation control signal P4. The word substitution unit 752 may substitute the rotation key data ROT by a value to output the substitution key data SUB. The independent calculator 739 may perform a logic operation on the substitution key data SUB and the round constant RNC, and may output the conversion key data SUC.

The chain calculator 731 may perform a logic operation for the conversion key data SUC and the storage key data r[52], and may output the calculation key data c[44]. The chain calculators 732, 733, and 734 may perform logic operations for the storage key data items r[53], r[54], and r[55] and the calculation key data items c[44], c[45], and c[46], and may output the calculation key data items c[45], c[46], and c[47], respectively.

The load enable signals LD1, LD1B, LD2, and LD2B may be disabled and the calculation control signals P1 and P4 may be enabled. The load enable circuits 711, 712, 713, and 714 may output (e.g., continuously output) the storage key data items r[52], r[53], r[54], and r[55] as the input key data items w[52], w[53], w[54], and w[55], respectively, in response to the load enable signals LD1, LD1B, LD2, and LD2B.

The select circuit 743 may select the calculation key data c[47] in response to the calculation control signal P4 and may output it to the word substitution unit 752. The word substitution unit 752 may substitute the calculation key data c[47] by a value, and may output the substitution key data SUB. The select circuit 741 may output the substitution key data SUB to the chain calculator 735 in response to the calculation control signal P1. The chain calculator 735 may perform a logic operation on the storage key data r[56] and the substitution key data SUB, and may output the calculation key data c[48]. The chain calculators 736, 737, and 738 may perform logic operations on the storage key data items r[57], r[58], and r[59] and the calculation key data items c[48], c[49], and c[50], and may output the calculation key data items c[49], c[50], and c[51], respectively.

The load enable signals LD3, LD3B, LD4, and LD4B, the internal select signals M3 and M4 and the output select signal S1 may be enabled and the output select signal S2 may be disabled. The load enable circuits 715, 716, 717, and 718 may output the calculation key data items c[48], c[49], c[50], and c[51] as the input key data items w[48], w[49], w[50], and w[51], respectively in response to the load enable signals LD3, LD3B, LD4, and LD4B. The internal select circuits 765, 766, 767 and 768 may select the input key data items w[48], w[49], w[50], and w[51], respectively, in response to the internal select signals M3 and M4 and may output them as the output key data items x4, x5, x6, and x7, respectively. The output selector 770 may select the output key data items x4, x5, x6, and x7 in response to the output select signals S1 and S2 and may output them as the third decryption round key DRKEY3. The key scheduler 700 may generate the third decryption round key DRKEY3 including the output key data items x4, x5, x6, and x7, that is, the input key data items w[48], w[49], w[50], and w[51] during a sixteenth cycle of the clock signal CLK.

The registers 725, 726, 727, and 728 may store the input key data items w[48], w[49], w[50], and w[51] and output them as the storage key data items r[48], r[49], r[50], and r[51], respectively. The load enable signals LD3, LD3B, LD4, and LD4B and the internal select signals M3 and M4 may be disabled, and the load enable signals LD1, LD1B, LD2 and LD2B and the internal select signals M1 and M2 may be enabled. The output select signals S1 and S2 and the calculation control signals P2 and P4 may be disabled, and the calculation control signal P3 may be enabled.

The load enable circuits 711, 712, 713, and 714 may output the calculation key data items c[44], c[45], c[46], and c[47] as the input key data items w[44], w[45], w[46] and w[47], respectively, in response to the load enable signals LD1, LD1B, LD2, and LD2B. The internal select circuits 761, 762, 763, and 764 may select the input key data items w[44], w[45], w[46], and w[47], and may output them as the output key data items x0, x1, x2, and x3, respectively, in response to the internal select signals M1 and M2. The internal select circuits 765, 766, 767, and 768 may select the storage key data items r[48], r[49], r[50], and r[51], and may output them as the output key data items x4, x5, x6, and x7, respectively, in response to the internal select signals M3 and M4. The output selector 770 may select the output key data items x0, x1, x2, and x3 in response to the output select signals S1 and S2 and may output them as the third decryption round key DRKEY3. The key scheduler 700 may generate the third decryption round key DRKEY3 including the output key data items x0, x1, x2, and x3, that is, the input key data items w[44], w[45], w[46] and w[47] during a seventeenth cycle of the clock signal CLK.

The registers 721, 722, 723 and 724 may store the input key data items w[44], w[45], w[46], and w[47], respectively in response to the clock signal CLK, and may output the stored input key data items w[44], w[45], w[46], and w[47] as the storage key data items r[44], r[45], r[46], and r[47], respectively. The select circuit 742 may select the output key data x7 (that is, the storage key data r[51]) and may output it to the word rotation unit 751 in response to the calculation control signal P4. The key scheduler 700 may repeat the calculating operation and the outputting of the third decryption round key DRKEY3, for example, until the chain calculators 731 through 738 may output the calculation key data items c[0] through c[7], respectively.

The key scheduler 700 need not receive the initial round key EIKEY3 including the initial key data items w[0] through w[7] and the decryption round key DRKEY3 may be generated.

The registers 721 through 728 may output stored input key data items w[52] through w[59] as storage key data items r[52] through r[59], respectively. The load enable signals LD1, LD1B, LD2, LD2B, LD3, LD3B, LD4, and LD4B and the internal select signals M1, M2, M3, and M4 may be disabled. The load enable circuits 711 through 718 may output (e.g., continuously output) the storage key data items r[52] through r[59] as the input key data items w[52] through w[59], respectively, in response to the load enable signals LD1, LD1B, LD2, LD2B, LD3, LD3B, LD4, and LD4B. The internal select circuits 761 through 768 may output the storage key data items r[52] through r[59] as the output key data items x0 through x7, respectively, in response to the internal select signals M1, M2, M3 and M4. Subsequent operations of the key scheduler 700 may be the same, or substantially the same as the corresponding operations of generating the third decryption round key DRKEY3 when the key scheduler 700 receives the initial round key EIKEY3 including the initial key data items w[0] through w[7].

The key scheduler 700 may generate the third decryption round key DRKEY3, and the registers 721 through 724 and the registers 725 through 728 may store updated (e.g., alternately updated) input key data items w[8n] through w[8n+3] and w[8n+4] through w[8n+7], respectively, for each cycle of the clock signal CLK. The decryption round key DRKEY3 may be generated by the key scheduler 700, based on clock cycles, which may be represented in the following table.

TABLE 6

| Clock cycle | x0 | x1 | x2 | x3 | x4 | x5 | x6 | x7 |
|---|---|---|---|---|---|---|---|---|
| 1 | — | — | — | — | r[56] | r[57] | r[58] | r[59] |
|  | r[52] | r[53] | r[54] | r[55] | — | — | — | — |
| 2 | — | — | — | — | w[48] | w[49] | w[50] | W[51] |
| . | . | . | . | . | . | . | . | . |
| . | . | . | . | . | . | . | . | . |
| . | . | . | . | . | . | . | . | . |
| 14 | w[0] | w[1] | w[2] | w[3] | — | — | — | — |

Figure 8B:
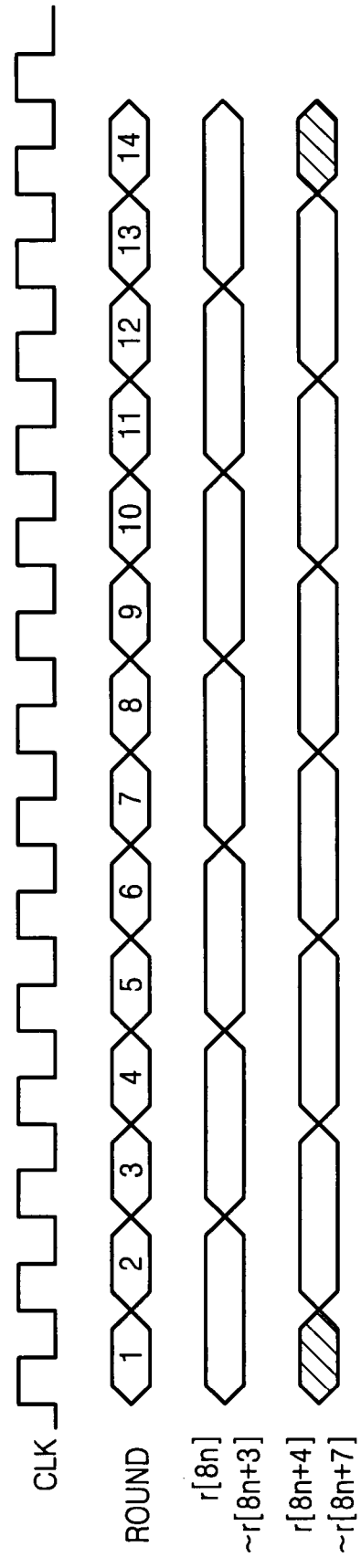

FIG. 8b is an example of a timing diagram of the storage key data items r[8n] through r[8n+7] output from the registers 721 through 728, for example, when the key scheduler 700 generates the third decryption round key DRKEY3. Referring to Table 6 and FIG. 8b, the storage key data items r[8n], r[8n+1], r[8n+2], and r[8n+3] output from the registers 721, 722, 723, and 724 and the storage key data items r[8n+4], r[8n+5], r[8n+6] and r[8n+7] output from the registers 725, 726, 727 and 728 may be toggled, (e.g., alternately toggled) for each cycle of the clock signal CLK.

Figure 9:
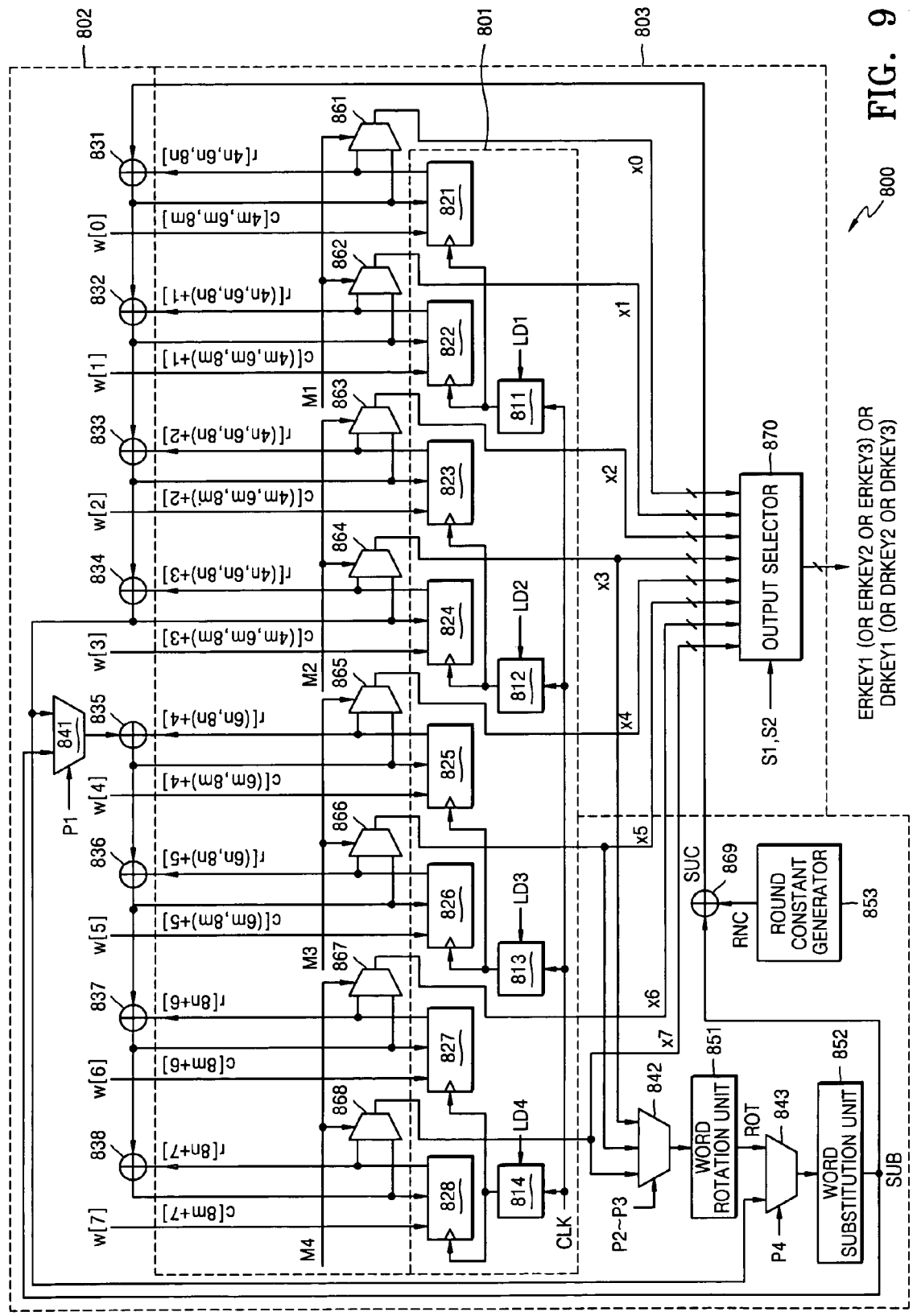
FIG. 9 illustrates another exemplary embodiment of a key scheduler according to the present invention.

FIG. 9 illustrates another exemplary embodiment of a key scheduler 800. Referring to FIG. 9, the key scheduler 800 may include a key storage unit 801, a key calculating unit 802 and a key output unit 803. The configuration and operation of the key scheduler 800 may be the same, or substantially the same as the key scheduler 700 shown in FIG. 3.

However, the key storage unit 801 of the key scheduler 800 may include clock gate circuits 811, 812, 813, and 814 and registers 821 through 828. Each of the clock gate circuits 811, 812, 813, and 814 may be connected to two registers. The first clock gate circuit 811 may be connected to registers 821 and 822, and the clock gate circuit 812 may be connected to registers 823 and 824. The clock gate circuit 813 may be connected to the registers 825 and 826, and the clock gate circuit 814 may be connected to the registers 827 and 828. The clock gate circuits 811, 812, 813, and 814 may provide the clock signal CLK to the registers 821 through 828, respectively, or interrupt the supply of the clock signal CLK in response to load enable signals LD1, LD2, LD3 and LD4. The registers 821 through 828 may store signals, which may or may not be input thereto.

Figure 10:
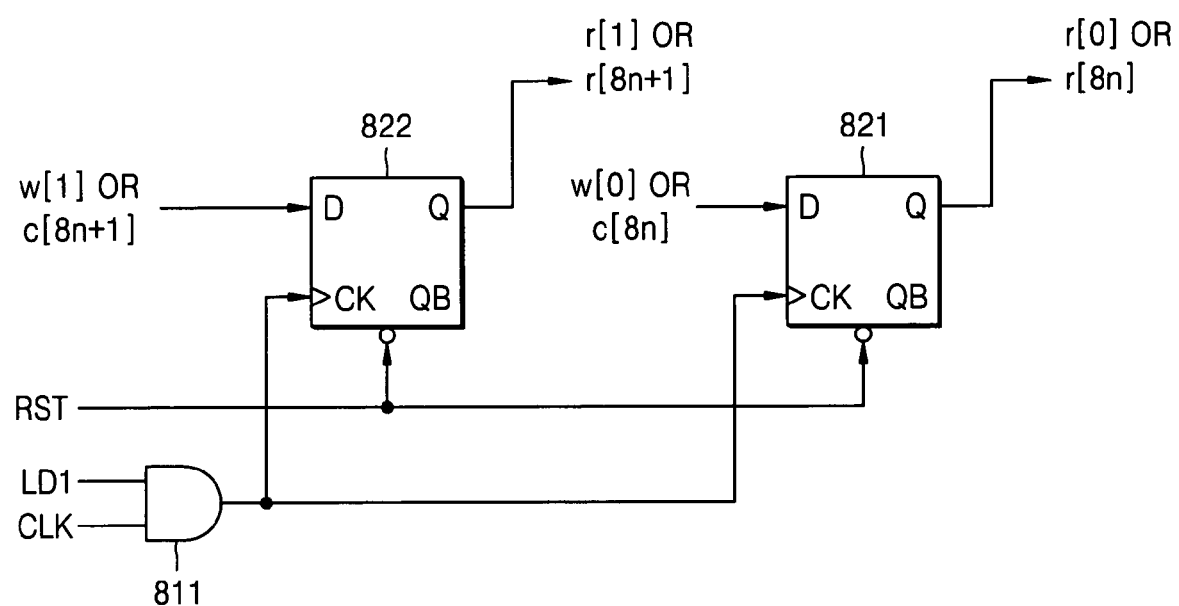
FIG. 10 illustrates an exemplary embodiment of the clock gate circuits and registers of FIG. 9, according to the present invention.

FIG. 10 illustrates the clock gate circuit 811 and registers 821 and 822. The configurations and operations of the clock gate circuits 812, 813, and 814 may be the same, or substantially the same, as the configuration and operation of the clock gate circuit 811.

Referring to FIG. 10, the clock gate circuit 811 may be an AND gate circuit. The clock gate circuit 811 may receive the load enable signal LD1 and the clock signal CLK. The clock gate circuit 811 may or may not output the clock signal CLK to the registers 821 and 822 in response to the load enable signal LD1. The first clock gate circuit 811 may output the clock signal CLK, for example, when the load enable signal LD1 is enabled and it may not output the clock signal CLK, for example, when the load enable signal LD1 is disabled.

The registers 821 and 822 may store w[0] and w[1] or c[8n] and c[8n+1], respectively, when they receive the clock signal CLK.

Although exemplary embodiments of the present invention have been described with regard to initial round keys EIKEY1, EIKEY2 and EIKEY3 of, for example, 128 bits, 192 bits and 256 bits, it will be understood that the initial round keys EIKEY1, EIKEY2, and/or EIKEY3 may be any suitable number of bits. Further, any of the round keys, as described herein in connection with the exemplary embodiments of the present invention may be any suitable number of bits.

Although exemplary embodiments of the present invention have been described with respect to the generation of, for example, 10 encryption keys ERKEY1, or 10 decryption keys DRKEY1, it will be understood that exemplary embodiments of the present invention may generate any suitable number of encryption or decryption keys.

Although exemplary embodiments have been described with regard to the components illustrated in the figures corresponding thereto, for example, the key storage unit 701 implemented in the key scheduler 700, it will be understood that similar components (e.g., key storage unit 701 and key storage unit 801) may be interchangeable. For example, the key storage unit 801 may be implemented in the key scheduler 700.

Although exemplary embodiments of the present invention have been described with respect to natural numbers, it will be understood that exemplary embodiments of the present invention may use any suitable numbers.

Although exemplary embodiments have been described with regard to a 'high' logic level '1' and a 'low' logic level '0', it will be understood that 'high' logic level and 'low' logic level may be '1' and '0', interchangeably.

While the present invention has been particularly shown and described with reference to exemplary embodiments thereof, it will be understood by those of ordinary skill in the art that various changes in form and details may be made therein without departing from the spirit and scope of the present invention as defined by the following claims.

As described above, exemplary embodiments of the key scheduler according to the present invention may selectively generate an encryption round key and a decryption round key corresponding to the length of an initial round key and may reduce the number of substitution tables required for generating round keys, and/or decrease the size of the encryption/decryption system, which may employ the key scheduler. Exemplary embodiments of the key scheduler may reduce toggling of the output signals of registers in response to the initial round key length, and may reduce current consumption.

What is claimed is:

1. A key scheduler comprising:
    a key storage unit for receiving and storing calculation key data items or storage key data items as input key data items in response to load enable signals and a clock signal and outputting the stored input key data items as the storage key data items;
    a key calculating unit for calculating the storage key data items and outputting the calculation key data items as a calculation result in response to calculation control signals; and
    a key output unit for selecting parts of the input key data items and the storage key data items in response to output control signals for each round, and outputting the selected parts as an encryption round key or a decryption round key, wherein the key storage unit includes, load enable circuits for outputting the calculation key data items or the storage key data items as the input key data items in response to the load enable signals; and registers for storing the input key data items received from the load enable circuits in response to the clock signal and outputting the stored input key data items as the storage key data items, wherein a total size of registers is greater than a size of the encryption round key or the decryption round key output from the key output unit for each round.

2. The key scheduler as claimed in claim 1, wherein the key storage unit stores initial key data items associated with an initial round key in response to the load enable signals and the clock signal when the initial key data items are received from an external apparatus, and outputs the initial key data items as the storage key data items.

3. The key scheduler as claimed in claim 2, wherein each of the initial key data items has N bits, and the number of encryption and decryption round keys and the number of times the storage key data items are calculated are determined based on the size of the initial key data items.

4. The key scheduler as claimed in claim 3, wherein the key calculating unit calculates the storage key data items R times, where R is smaller than N, when the initial key data items is J bits, where J is larger than N, calculates the storage key data items S times, where S is between R and N, when the initial key data items is K bits, where K is larger than J, and calculates the storage key data items T times, where T is between S and N, when the initial key data items is L bits, where L is larger than K, in response to the calculation control signals.

5. The key scheduler as claimed in claim 4, wherein the key output unit generates R encryption round keys or decryption round keys of J bits, when the initial key data items are J bits, generates S encryption round keys or decryption round keys of J bits when the initial key data items is K bits, and generates T encryption round keys or decryption round keys of J bits when the initial key data items is L bits, in response to the output control signals.

6. The key scheduler as claimed in claim 1, wherein the key output unit outputs a last encryption round key as a first decryption round key in response to the output control signals.

7. The key scheduler as claimed in claim 1, wherein the key calculating unit calculates the storage key data items 2R times, when the initial key data items are J bits, 2S times, when the initial key data items are K bits, and 2T times, when the initial key data items are L bits, where R is less than S, S is less than T, T is less than K, and K is less than L.

8. The key scheduler as claimed in claim 1, wherein the key output unit is disabled when the key calculating unit calculates the storage key data items R-1 times, S-1 times or T-1 times, and the key output unit is enabled when the key calculating unit calculates and outputs a last decryption round key.

9. The key scheduler as claimed in claim 1, wherein the key storage unit stores the input key data items for each clock cycle, when the initial key data items are J bits, stores the input key data items for every two clock cycles when the initial key data items are K bits, and stores a part of the input key data items for each clock cycle when the initial key data items are L bits, where J is less than K and K is less than L.

10. The key scheduler as claimed in claim 9, wherein the load enable circuits output the calculation key data items as the input key data items when the load enable signals are enabled, and output the storage key data items as the input key data items when the load enable signals are disabled.

11. The key scheduler as claimed in claim 10, wherein parts of the load enable circuits are operated when the initial key data items is J or K bits, and all of the load enable circuits are operated when the initial key data items is L bits, where K is less than L, and J is less than K.

12. The key scheduler as claimed in claim 1, wherein each of the load enable signals is input to a pair of the load enable circuits.

13. The key scheduler as claimed in claim 1, wherein the number of the load enable circuits operated when the initial key data items are J bits is smaller than the number of the load enable circuits operated when the initial key data items is K bits, where J is less than K.

14. The key scheduler as claimed in claim 1, wherein the number of the load enable circuits and the number of the registers, included in the key storage unit, are L/N.

15. The key scheduler as claimed in claim 1, wherein the key calculating unit includes,
a plurality of chain calculators, each of which is connected to a corresponding register and adapted to output the calculation key data items in response to the storage key data items and conversion key data; and
an independent calculator adapted to perform a logic operation on a substitution key data and a round constant and output a conversion key data.

16. The key scheduler as claimed in claim 15, wherein each of the plurality of chain calculators and the independent calculator performs an exclusive-OR operation.

17. The key scheduler as claimed in claim 15, wherein a first chain calculator performs a logic operation on the conversion key data and a first storage key data item to output a first calculation key data item, and each of the remaining plurality of chain calculators performs a logic operation on a previous calculation key data items, which is received from a previous chain calculator, and storage key data items, which is received from the corresponding register, and outputs a next calculation key data item.

18. The key scheduler as claimed in claim 15, wherein the output control signals include internal select signals and output select signals, and the key output unit includes,
internal select circuits for selecting and outputting the input key data items or the storage key data items as output key data items in response to the internal select signals; and
an output selector for receiving the output key data items from the internal select circuits and selecting parts of the output key data items in response to the output select signals to output as the encryption round key or the decryption round key.

19. The key scheduler as claimed in claim 18, wherein each of the internal select signals is input to a pair of internal select circuits.

20. The key scheduler as claimed in claim 19, wherein the internal select circuits select the calculation key data items to output as the output key data items, when the internal select signals are enabled, and select the storage key data items to output as the output key data items, when the internal select signals are disabled.

21. The key scheduler as claimed in claim 15, wherein the calculation control signals include first, second, third and fourth calculation control signals, and the key calculating unit further includes,
a first select circuit for selecting one of a calculation key data item, from a first chain calculator, and a substitution key data item, to output the selected data to a next chain calculator in response to the first calculation control signal;

a second select circuit for outputting one of a first, second, and third output key data items, which are output from a first, second, and third internal select circuits, in response to the second and third calculation control signals;

a word rotation unit for rotating the bits of the output key data items, received from the second select circuit to output rotation key data;

a third select circuit for outputting one of the rotation key data and the calculation key data item in response to the fourth calculation control signal, a word substitution unit for substituting one of the rotation key data and the calculation key data item by the substitution key data using a plurality of substitution tables, and a round constant generator for generating a round constant and outputting it to an independent calculator.

22. The key scheduler as claimed in claim 21, wherein the first calculation control signal is disabled when the initial key data items are J or K bits, and alternately enabled and disabled for each clock cycle when the initial key data items are L bits, both of the second and third calculation control signals are disabled when the initial key data items are J bits, the second calculation control signal is enabled and the third calculation control signal is disabled when the initial key data items are K bits, and the second calculation control signal is disabled and the third calculation control signal is enabled when the initial key data items are L bits, and the fourth calculation control signal is disabled when the initial key data items are J or K bits, and alternately disabled and enabled for each clock cycle when the initial key data items are L bits, wherein J is less than K, and K is less than L.

23. The key scheduler as claimed in claim 22, wherein the first select circuit outputs the substitution key data when the first calculation control signal is enabled and outputs the calculation key data item when the first calculation control signal is disabled;

the second select circuit outputs the first output key data item when the second and third calculation control signals are disabled, outputs the second output key data item when the second calculation control signal is enabled and the third calculation control signal is disabled, and outputs the third output key data item when the second calculation control signal is disabled and the third calculation control signal is enabled; and the third select circuit outputs the rotation key data when the fourth calculation control signal is enabled, and outputs the rotation key data when the fourth calculation control signal is disabled.

24. The key scheduler as claimed in claim 21, wherein the output key data items are J, K or L bits, and the output selector selects the output key data items of J bits from the output key data items to output them as the encryption round key or the decryption round key for each clock cycle.

25. The key scheduler as claimed in claim 1, wherein key storage unit further includes, clock gate circuits for providing the clock signal to the registers or interrupting the supply of the clock signal in response to load enable signals.

26. A system for encrypting or decrypting data, the system comprising:

a controller;

a processor; and a key scheduler; wherein the controller is adapted to control the processor and the key scheduler, the processor is adapted to encrypt or decrypt data based on an encryption or decryption key generated by the key scheduler, and the key scheduler further includes, a key storage unit for receiving and storing calculation key data items or storage key data items as input key data items in response to load enable signals and a clock signal and outputting the stored input key data items as the storage key data items, a key calculating unit for calculating the storage key data items and outputting the calculation key data items as a calculation result in response to calculation control signals, and a key output unit for selecting parts of the input key data items and the storage key data items in response to output control signals for each round, and outputting the selected parts as an encryption round key or a decryption round key, wherein the key storage unit includes, load enable circuits for outputting the calculation key data items or the storage key data items as the input key data items in response to the load enable signals; and registers for storing the input key data items received from the load enable circuits in response to the clock signal and outputting the stored input key data items as the storage key data items, wherein a total size of registers is greater than a size of the encryption round key or the decryption round key output from the key output unit for each round.

27. The system as claimed in claim 26, wherein the key storage unit stores initial key data items associated with an initial round key in response to the load enable signals and the clock signal when the initial key data items are received from an external apparatus, and outputs the initial key data items as the storage key data items.

28. The system as claimed in claim 27, wherein each of the initial key data items has N bits and the number of encryption and decryption round keys and the number of times the storage key data items are calculated are decided by the size of the initial key data items.

29. The system as claimed in claim 28, wherein the key calculating unit calculates the storage key data items R times, where R is smaller than N, when the initial key data items is J bits, where J is larger than N, calculates the storage key data items S times, where S is between R and N, when the initial key data items is K bits, where K is larger than J, and calculates the storage key data items T times, where T is between S and N, when the initial key data items is L bits, where L is a natural number larger than K, in response to the calculation control signals.

* * * * *